United States Patent [19]

Nacman et al.

[11] Patent Number: 5,764,377
[45] Date of Patent: Jun. 9, 1998

[54] VIDEO INTERLACE SYSTEM FOR MULTIBEAM RASTER OUTPUT SCANNER

[75] Inventors: Aron Nacman, Rochester; Daniel A. Mohabir, Walworth, both of N.Y.

[73] Assignee: Xerox Corporation, Stamford, Conn.

[21] Appl. No.: 356,767

[22] Filed: Dec. 15, 1994

[51] Int. Cl.⁶ .............................. H04N 1/40; H04N 1/32; H04N 1/04; H04N 1/23
[52] U.S. Cl. .................. 358/444; 358/468; 358/480; 358/481; 358/296; 358/300; 358/404; 395/115; 395/116
[58] Field of Search ..................... 358/444, 445, 358/468, 480, 481, 296, 300, 403, 404; 347/237, 247

[56] References Cited

U.S. PATENT DOCUMENTS

| | | | |
|---|---|---|---|
| 4,560,989 | 12/1985 | Radochonski et al. | 347/229 |
| 4,963,894 | 10/1990 | Lebeau et al. | 358/296 |
| 4,977,458 | 12/1990 | Granger et al. | 358/456 |
| 5,134,495 | 7/1992 | Frazier et al. | 358/456 |
| 5,199,101 | 3/1993 | Cusick et al. | 395/115 |
| 5,210,749 | 5/1993 | Firoozmand | 370/463 |
| 5,325,216 | 6/1994 | AuYeung | 358/296 |
| 5,373,371 | 12/1994 | Masui | 358/444 |
| 5,479,527 | 12/1995 | Chen | 358/427 |
| 5,563,711 | 10/1996 | Sakai et al. | 358/296 |
| 5,581,296 | 12/1996 | Tanimoto et al. | 347/237 |
| 5,629,781 | 5/1997 | Ueno et al. | 358/523 |

*Primary Examiner*—Edward L. Coles, Sr.
*Assistant Examiner*—Tia M. Harris
*Attorney, Agent, or Firm*—Oliff & Berridge, PLC

[57] ABSTRACT

A raster output scanner data controller reads pixels of an image from an image memory and outputs serially pixel data streams to a raster output scanner. The data controller includes an image memory storing a plurality of pixel data blocks in a scan line order, an image memory controller coupled to the image memory, a plurality of first-in, first-out memories coupled to the image memory controller for storing pixel data blocks corresponding to a plurality of beams, and an image controller coupled to the plurality of first-in, first-out memories. The pixel data blocks are transferred from the image memory to the plurality of first-in, first-out memories. The image controller reads the pixel data blocks from the plurality of first-in, first-out memories, converts the pixel data blocks read from the plurality of first-in, first-out memories into a plurality of pixel data streams and outputs the plurality of pixel data streams to the raster output scanner.

19 Claims, 17 Drawing Sheets

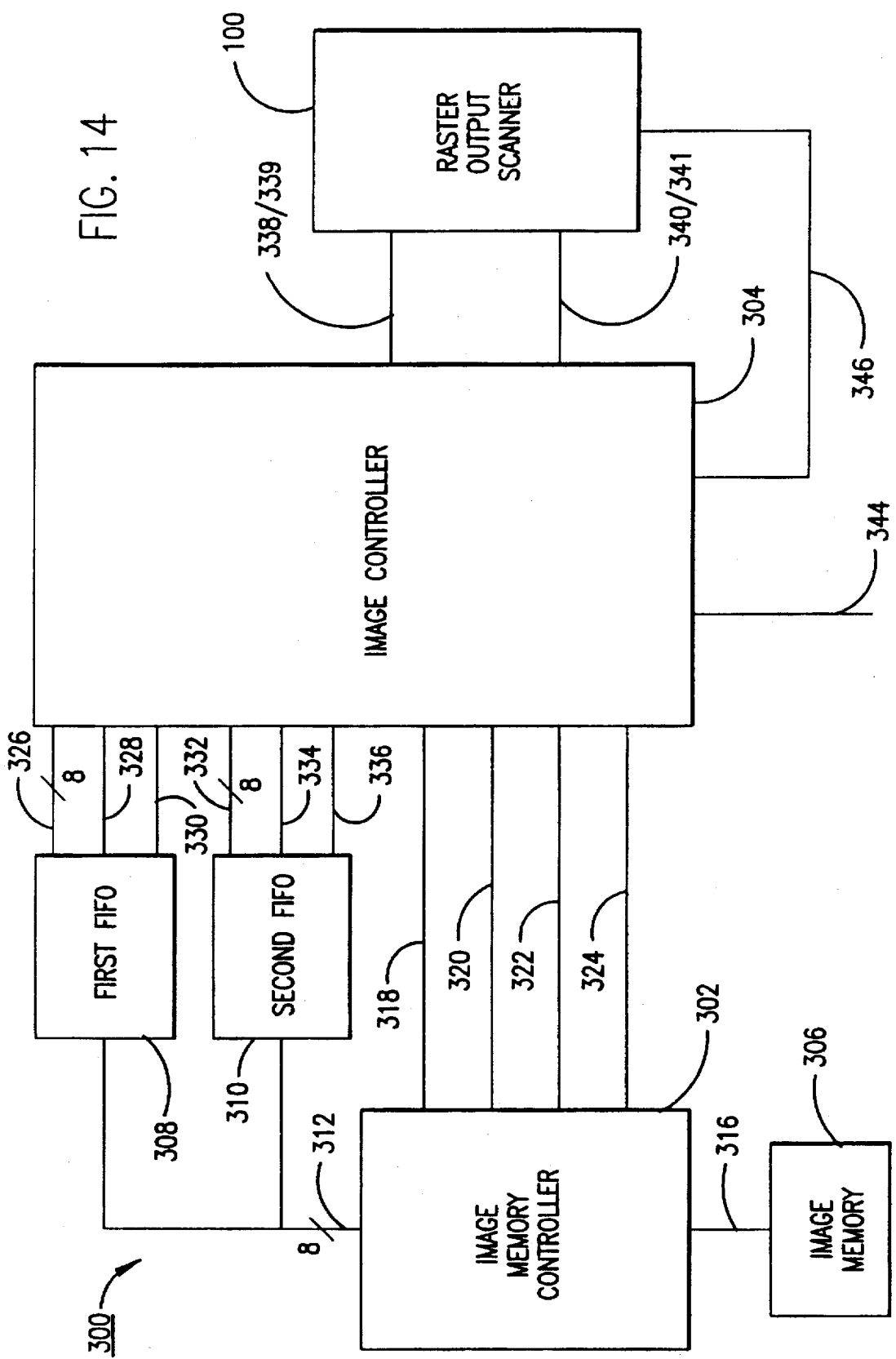

VIDEO INTERLACE SYSTEM FOR MULTIBEAM RASTER OUTPUT SCANNER

BACKGROUND OF THE INVENTION

1. Field of the Invention

This invention generally relates to an image forming apparatus and method. In particular, this invention relates to an apparatus and method for controlling and outputting data for a multibeam raster output scanner.

2. Background of the Invention

A conventional multibeam raster output scanner 100 (ROS), as shown in FIG. 1, has a reflective multifaceted polygon mirror 24 that is rotated about its central axis 50. The polygon mirror 24 repeatedly sweeps intensity modulated beams of light 12 and 14 emitted from a multibeam laser 74 across a photosensitive recording medium 30 which rotates about an axis 62. The beams 12 and 14 move in a line scanning direction (also known as the fast-scan direction) while the recording medium advances in an orthogonal, or "process", direction (also known as the slow scan direction). The beams scan the recording medium in accordance with a raster scanning pattern. Digital printing is performed by serially intensity modulating each of the beams 12 and 14 in accordance with a picture element (pixel) data stream. Thus, the photosensitive recording medium 30 is exposed to form the image represented by the pixel data. Printers that sweep several beams simultaneously are referred to as multibeam printers.

The pixel data of an image is sequentially stored in an image memory. The first pixel data of the first line is stored, followed by the second pixel data of the first line, and so forth until all the pixel data of the first line is stored. The first pixel data of the second line follows the last pixel data of the first line, which itself is followed by the second pixel data of the second line, until all the pixel data of the second line is stored. This process is repeated until the pixel data of all of the lines of a page is stored in the image memory.

During a printing operation, the image memory is sequentially read so that the first pixel data of the first line is read, then the second pixel data of the first line is read, and so on, until all of the pixel data of the first line are read. Then all of the pixel data of the second line are similarly read, and then all of the pixel data of the third line are read until all of the pixel data of all the lines of the page image are read.

When the printer has multiple beams, each beam scans a unique set of lines of the image. Since there are multiple beams, the pixel data streams for each line scanned by the beams during a single fast-scan scanning pass must be available during that scanning pass. In order to accommodate this requirement, a small amount of storage is normally provided in the form of First-In, First-Out storage devices (FIFOs), so that the data for each of the lines to be scanned (scanlines) can be stored in the FIFOs, with the data for one scanline stored in a corresponding FIFO. These FIFOs allow multiple pixel data streams to be generated concurrently to support simultaneous scanning by the multiple beams.

Generally, if there are n beams in the multibeam printer, more than n FIFOs will be needed, because beams usually do not scan consecutive lines. Manufacturing constrains of the laser diodes prevent beams from scanning adjacent lines. Also, undesirable beam interactions occur when the beams are close to each other. Thus, beams are usually separated by a number of scanlines. The number of lines between the line scanned by one beam and the line scanned by the next adjacent beam is called the interlace factor. For a two beam scanner, one beam may scan odd lines, 1, 3, 5, . . . , and the other beam may scan even lines, 2, 4, 6, . . . . For an interlace factor of 2, the first beam scans line 1 while the second beam scans line 4. Thus, the pixel data corresponding to lines 1 and 4 must be read from the image memory before the first scan operation. However, since the pixel data for the lines of the image are sequentially read from the image memory, the pixel data for lines 1–3 must be read in order to read the pixel data for line 4. Thus, at least 4 FIFOs must be available to store the pixel data for all four lines, even though only the pixel data for lines 1 and 4 are needed.

Usually, in a dual beam ROS 100, a reduction in the number of required FIFOs is achieved by placing the pixel data for all odd lines into a first FIFO, placing the pixel data for all even lines into a second FIFO and doubling the size of each FIFO. In this scheme, the pixel data corresponding to lines 1 and 3 are sequentially placed into the first FIFO and the pixel data corresponding to lines 2 and 4 are sequentially placed into the second FIFO. Since the beams always scan in the fast scan direction, the pixel data from each FIFO are always read in a sequential fashion. Because the beams 12 and 14 always scan in the slow scan direction, the pixel data corresponding to line 1 is read before the pixel data corresponding to line 3, and the pixel data corresponding to line 2 is read before the pixel data corresponding to line 4. Thus, two FiFOs are sufficient to support a dual beam ROS 100.

A pixel data element is the binary representation of one pixel. Thus, if the pixel data element comprises of one bit, then the pixel can be either a black dot or a white dot. An image printed using one bit pixel data elements comprises of black and white pixels or dots on a page. If the pixel data element comprises of two bits, then the pixel can be a black dot, a dark gray dot, a light gray dot or a white dot. Thus, two bit pixel data elements provide for four levels of gray: black, dark gray, light gray and white. An image printed using two bit pixel data elements comprises of dots on a page where each dot has four levels of gray.

The image memory is usually organized into bytes or eight bit blocks. When the pixel data element for each image pixel comprises only a single bit, a single byte contains the pixel data elements corresponding to eight image pixels. However, since the scanning beams progress serially from the first pixel position to the last pixel position of the image along the fast scan direction, the pixel data elements must be presented to the beams one "pixel" at a time in the scanned order. Thus a parallel-to-serial conversion must be performed between the first and second FIFOs and the dual beam ROS 100.

Conventionally, a second set of FIFOs is used to convert the pixel data elements from the parallel byte format output by the first and second FIFOs into the serial pixel bit data format usable by the multibeam ROS 100. For a dual beam ROS 100, this is achieved by using two additional FIFOs, each having a width equal to the number of bits of the pixel data element for each image pixel. The pixel data from the first set of FiFOs are read, converted into single pixel data elements corresponding to individual image pixels and written into the second set of FIFOs. When the pixel data elements for each image pixel comprises one bit, each byte contains the pixel data elements for eight image pixels. The pixel data element for each image pixel is sequentially placed in a unique address in one of the second set of FIFOs. When the beams begin to scan a line, the pixel data elements for the image pixels to be printed is sequentially read from the second set of FIFOs and a resulting serial stream of pixel data is fed to each beam in the exact order required for scanning the corresponding image line.

The conventional scanning system described above requires two sets of FIFOs. The second set of FIFOs is required to function at the beam scan rate, which is conventionally about 40–50 MHz. Also, the second set of FIFOs is required to have non-standard FIFO formats based on the number bits of pixel data element in each image pixel. Thus, the second set of FIFOs add undesirable cost to the scanning system. Additionally, the special requirements for the second set of FIFOs further increase their cost.

SUMMARY OF THE INVENTION

This invention eliminates entirely the second set of FIFOs by reading pixel data from the first set of FIFOs and immediately performing a parallel-to-serial pixel data conversion to generate the output pixel data stream to be output the raster output scanner. An image memory stores the pixel data to be printed. For a dual beam ROS 100, a first FIFO receives the pixel data corresponding to the odd numbered lines from the image memory and a second FIFO receives the pixel data corresponding to the even numbered lines from the image memory. The pixel data from the image memory is transferred. An image controller converts the pixel data read from the FIFOs into serial pixel data streams that are usable by a multibeam printing system.

In the first preferred embodiment, an image memory controller transfers the pixel data from the image memory to the first set of FIFOs, while the image controller reads the pixel data from the first set of FIFOs, converts the pixel data into serial pixel data streams and outputs the serial pixel data streams to the ROS. In the second preferred embodiment, the image controller transfers the pixel data from the image memory to the first set of FIFOs as well as reading the pixel data from the first set of FIFOs, converting the pixel data into a plurality of serial pixel data streams and outputting the serial pixel data streams to the ROS.

These and other advantages will become apparent from the following detailed description in connection with the drawings.

BRIEF DESCRIPTION OF THE DRAWINGS

The invention will be described in detail with reference to the following drawings, wherein:

FIG. 14 is a block diagram of a second preferred embodiment of the raster output scanner output controller of this invention;

DETAILED DESCRIPTION OF THE PREFERRED EMBODIMENTS

Figure 2:
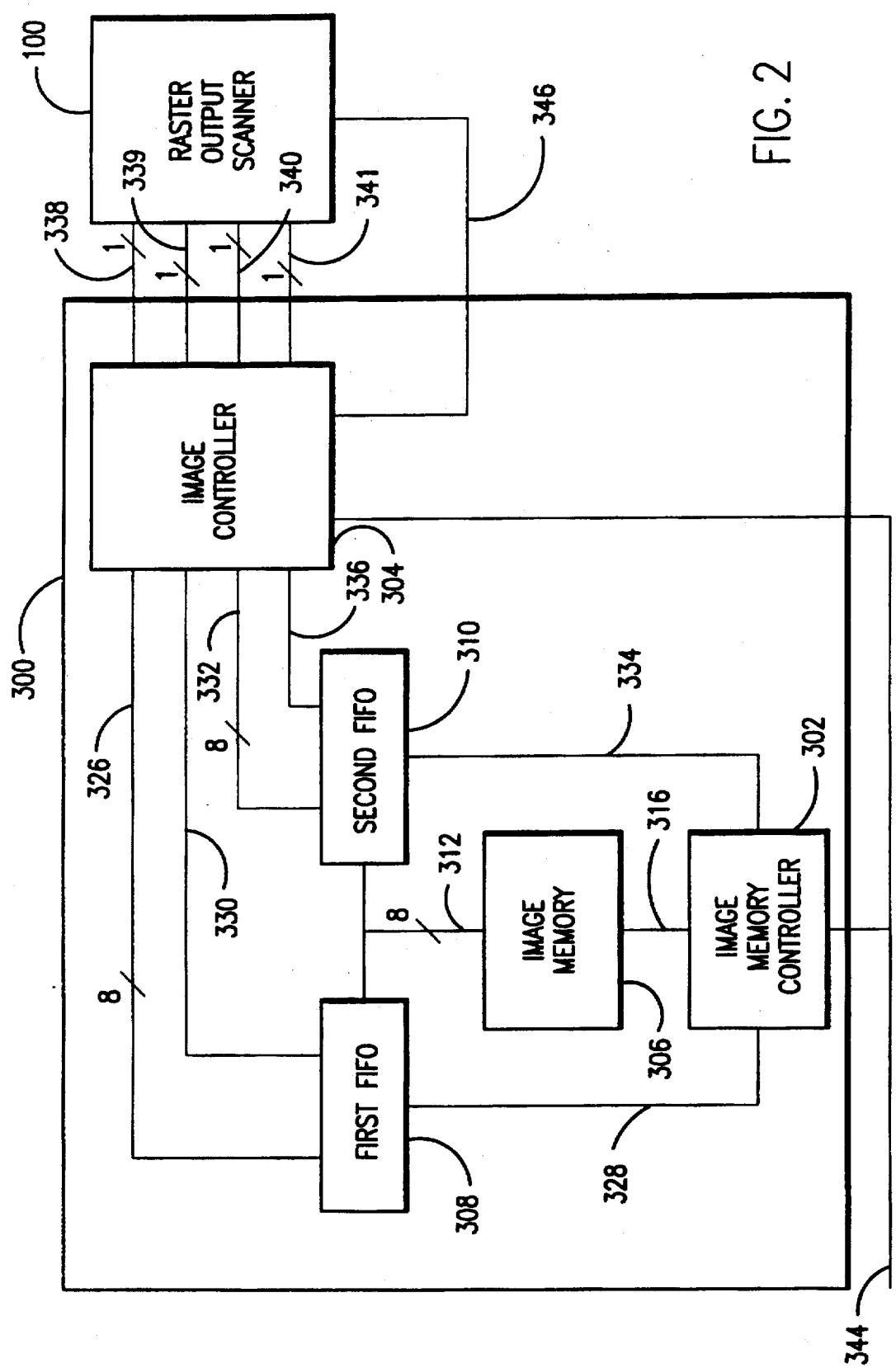
FIG. 2 is a block diagram of a first preferred embodiment of the raster output scanner output controller of this invention.

FIG. 2 shows a first preferred embodiment of a ROS data output controller 300 for controlling the multibeam laser 74 of the ROS 100. In this first preferred embodiment, the ROS 100 includes two beams 12 and 14 and uses an interlace factor of 2. The ROS data output controller 300 comprises an image memory controller 302, an image controller 304, an image memory 306, a first FIFO 308 and a second FIFO 310. The image memory 306 is connected to and controlled by the image memory controller 302 through a control signal line 316. The first FIFO 308 and the second FIFO 310 receive pixel data from the image memory 306 through data signal line 312. When the image memory controller 302 generates write signals to the FIFOs 308 and 310 on the write signal lines 328 and 334, the pixel data that is placed on signal line 312 by the image memory 306 is written into the first and second FIFOs 308 and 310, respectively. The image controller 304 sends read signals to the first and second FIFOs 308 and 310 on signal lines 330 and 336, respectively. The first and second FIFOs 308 and 310 respond to read signals output by the image controller 304 on signal lines 330 and 336 by outputting the next pixel data on signal lines 326 and 332, respectively. The image controller 304 receives a line sync signal from the ROS 100 on signal line 346. The image controller 304 reads the pixel data from the first and second FIFOs 308 and 310 and output the streams of serial pixel data required to modulate beam 12 on signal lines 338 and 340 and to modulate beam 14 on signal lines 340 and 341.

Figure 3:
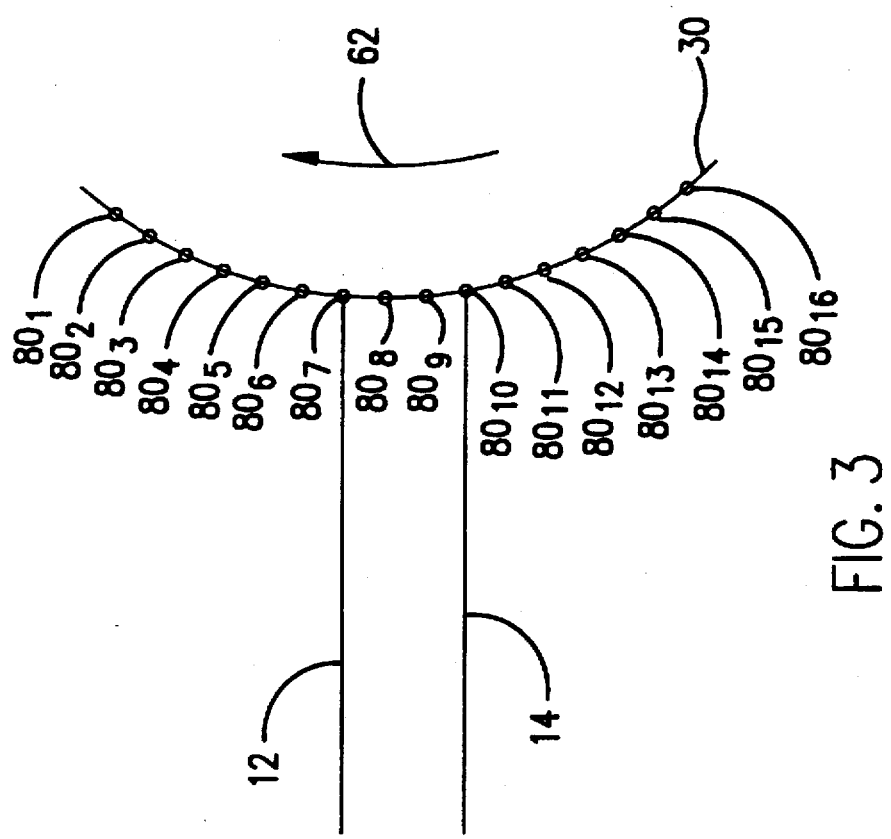
FIG. 3 is a side plan view of lines scanned by the dual beams of FIG. 1 onto a photosensitive recording medium.
Figure 4:
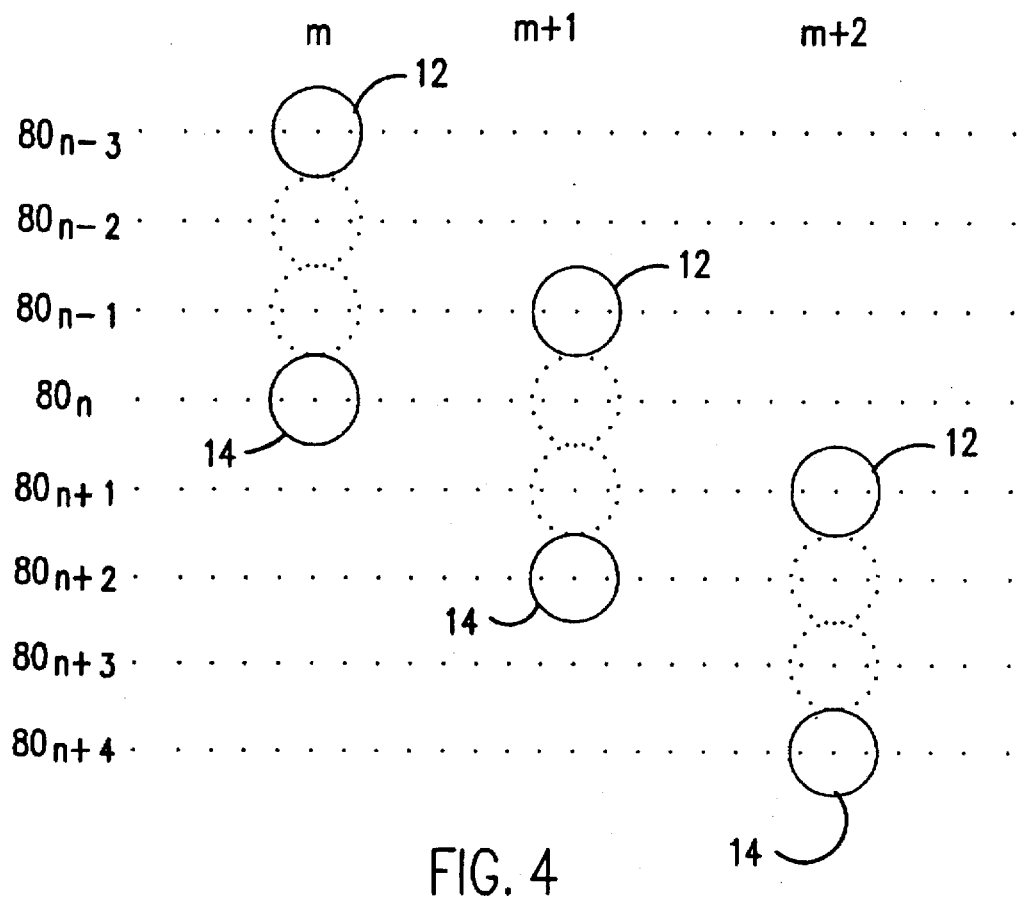
FIG. 4 illustrates the relationship between the scan lines scanned by two beams in response to three consecutive line sync signals.

FIG. 3 shows an expanded side view of the two beams 12 and 14 incident on the photosensitive recording medium 30. The photosensitive recording medium 30 rotates in the direction 62 while the beams 12 and 14 horizontally scan two scanlines $80_7$ and $80_{10}$ of the photosensitive recording medium 30. The beams 12 and 14 are scanned across the photosensitive recording medium 30 by the rotation of the polygon mirror 24. The interlace factor shown in FIG. 3 is defined as the number of scanlines separating the beams 12 and 14. For the system shown in FIG. 3, the beams 12 and 14 have an interlace factor of 2. FIG. 4 shows the scanlines 80 that are scanned by the beams 12 and 14 during consecutive scanning cycles m, m+1 and m+2. For each scanning cycle m, a line sync signal is generated to locate the position of the beams 12 and 14 laterally along the photosensitive recording member 30. A new line sync signal is generated by the ROS 100 each time the beams 12 and 14 scans a physical location on the photosensitive recording medium 30. Thus, as each scanning cycle of the ROS 100 begins, a line sync signal is output by the ROS 100 onto the signal line 346.

As shown in FIG. 4, during an mth scanning cycle the beam 12 scans the scanline $80_{n-3}$, while the beam 14 scans the scanline $80_n$, where n is twice m (i.e., n=2 m), for a dual beam ROS 100 with an interlace factor of 2. In a first scanning cycle, m=1 and thus n=2. Accordingly, the beam 14 scans the second scanline, $80_2$ while the beam 12 does not scan any scanline and is turned off because the line that would have been scanned by beam 12 is $80_{-1}$, which does not exist.

Then, during an (m+1)th scanning cycle, the beam 12 scans the scanline $80_{n-1}$, while the beam 14 scans the scanline $80_{n+2}$. Thus, in a second scanning cycle m=2, the beam 14 scans the fourth scanline, $80_4$ while the beam 12 scans the first scanline $80_1$.

Next, during an (m+2)th scanning cycle, the beam 12 scans the scanline $80_{n+1}$, while the beam 14 scans the scanline $80_{n+4}$. It should be appreciated that if the ROS 100 uses a different number of beams or a different interlace factor, the scanlines scanned during each scanning cycle will change.

Figure 5:
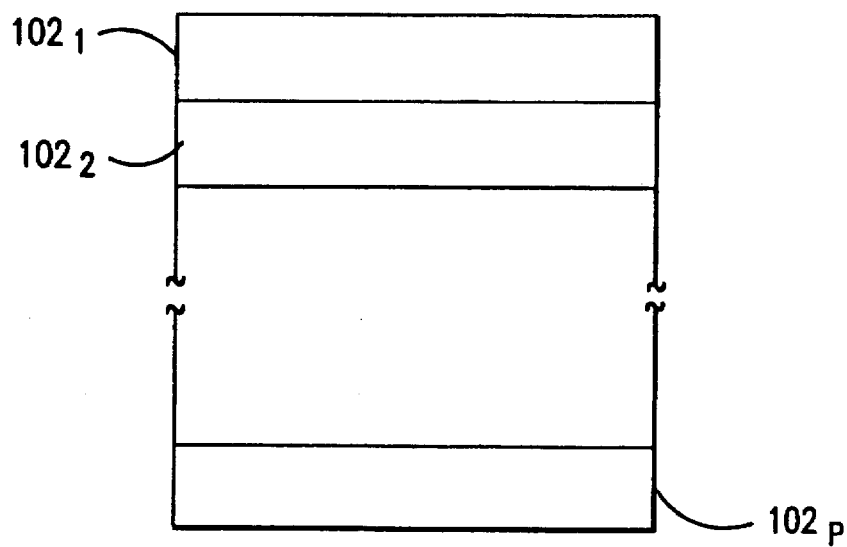
FIG. 5 is a block diagram of pixel data blocks sequentially stored in the image memory.

The image memory 306, as shown in FIG. 2, stores all the pixel data for a complete page. The pixel data corresponding to one line is blocked together in the image memory into a pixel data block 102, as shown in FIG. 5. The pixel data blocks 102 of consecutive lines 80 are sequentially stored in the image memory 306. The image memory 306 stores the pixel data block $102_1$, corresponding to line $80_1$, at the beginning of the image memory 306. The pixel data block $102_2$, corresponding to line $80_2$, is stored after the pixel data block $102_1$ and so forth until the pixel data block $102_p$, corresponding to the last line $80_p$ of the page, is stored as the last pixel data block 102 in the image memory 306. Of course, multiple or partial pages can be stored in the image memory 306 without affecting any aspect of this invention.

Figure 1:
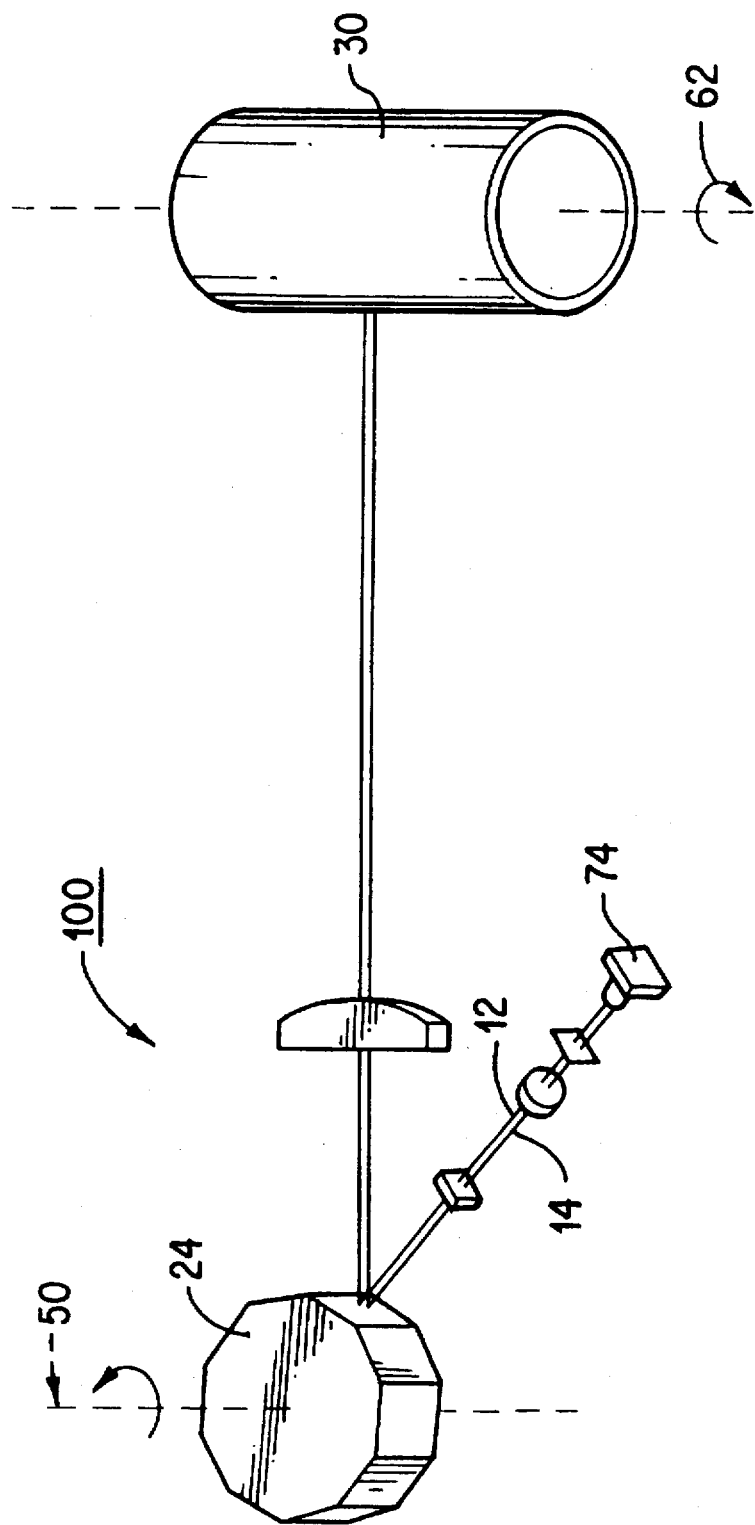
FIG. 1 is a schematic diagram of a dual beam ROS.

Generally, for the dual beam ROS 100 shown in FIG. 1, the image memory controller 302 writes the pixel data blocks $102_{(2n-1)}$ corresponding to the odd scanlines into the first FIFO 308 and the pixel data blocks $102_{2n}$ corresponding to the even scanlines into the second FIFO 310. The beam 12 receives pixel data only from the first FIFO 308, while the beam 14 receives pixel data only from the second FIFO 310. It should be appreciated that when any number of beams n are used in the ROS 100, there will be n FIFOs in the ROS data output controller 300. In this case, each FIFO will receive every nth scan line.

The rate at which data is read from the image memory 306 depends on the serial bit rate required to support the beams 12 and 14 and the number of pixel data elements that can be packed into a single image memory byte. If, for example, the beams 12 and 14 are modulated at a pixel clock rate of 40 MHz (i.e. 40 million image pixels are written by each beam 12 or 14 per second), then the FIFO must be read from at a rate of 40 MHz/d, where d is the number of pixel data elements corresponding to the different numbers of image pixel data elements packed in each byte of the FIFOs 308 or 310. Thus; if the pixel data element for each pixel is 2 bits wide, then d=8 bits/byte+2 bits/pixel=4 pixels/byte. Likewise, if the number of bits per pixel is 1, 4 or 8, then there are 8, 2 or 1 pixel data elements per byte. Accordingly, for 2 bits per pixel data element, the FIFO read rate is 40 MHz/4=10 MHz.

Since, for this dual beam ROS 100, there are two FIFOs 308 and 310, each being read at a 10 MHz rate and since both FIFOs 308 and 310 receive data from the same image memory 306, the data read rate from the image memory 306 is at least 20 MHz. That is, the pixel data is read from the FIFOs 308 and 310 in parallel and at a read rate of 10 MHz, resulting in a net data output from the FIFOs 308 and 310 of 20M bytes per second. In order to keep up with the FIFO data output rate, the FIFO input rate must be at least 20M bytes/second. Since the pixel data written to the FIFOs 308 and 310 is serially read out of the image memory 306, the image memory 306 read rate must be at least 20 MHz.

The 20 MHZ read rate for the image memory 306 is the minimum read rate that is necessary to keep up with the FIFO data output rate if the data is written into the FIFOs 308 and 310 only when the data is being read out of the FIFOs 308 and 310. However, data is being read out of the FIFOs 308 and 310 only for a percentage of the total time devoted to scanning one scanline. A large percentage of time is allocated for functions such as the mechanical processes required to move the photosensitive recording medium 30 to the next line. For example, in some applications, forty (40) percent of the total scanning time is devoted to functions other than the actual scanning of the image leaving sixty (60) percent of the total scanning time during which the beams 12 and 14 scan the image.

If the data is read from the image memory 306 during the total scanning time, then the read rate from the image memory 306 can be greatly reduced. For the example above where a read rate of 20 MHZ from the image memory 306 is required for the beams 12 and 14, and the beams 12 and 14 scan the photosensitive recording medium 30 during only sixty (60) percent of the total scanning time for each scanline, then the read rate from the image memory 306 can be reduced to 12 MHZ (0.6×20 MHZ) if the data is read from the image memory 306 utilizing the total scanning time for scanning each scanline.

The first FIFO 308 has a write pointer and a read pointer. When the first FIFO 308 receives a write signal on the signal line 328, the image memory word that is on the input signal line 312 is written into an address location pointed to by the write pointer. After the write operation is completed, the write pointer is incremented by 1 to point to the next available write location, preparing the first FIFO 308 for the next write operation. When the first FIFO 308 receives a read signal on the read line 330, the word at the address pointed to by the read pointer is read and placed onto the output signal line 326. The read pointer is then incremented by 1, preparing the first FIFO 308 for another read operation. When either the write pointer or the read pointer is pointing to the last available address of the first FIFO 308, a write or read signal increments the respective pointer by 1, causing the write or read pointer to point in an address location beyond the storage capacity of the first FIFO. This causes the first FIFO 308 to reset the pointer to the first location of the first FIFO 308. When the write pointer is incremented to the same value as the read pointer, then the first FIFO 308 sets a FULL flag indicating that the first FIFO 308 is full and can no longer receive any more data until the full condition is cleared by reading the next word from the first FIFO 308. When the read pointer is incremented to the same value as the write pointer, then the first FIFO 308 is empty. The second FIFO 310 functions similarly to the first FIFO 308.

When either the first or second FIFO 308 or 310 is empty and a further read signal is received on signal line 330 and 336, respectively, then an error condition is set. This error condition is dealt with by conventional error recovery routines, which are well known to those skilled in the art. However, any discussion of these conventional error receiver routines is beyond the scope of this invention.

The image memory controller 302 writes pixel data into the first and second FIFOs 308 and 310 by controlling the write lines 328 and 334, respectively. When data from the image memory 306 is ready to be received on signal line 312, the image memory controller 302 outputs write signals on the appropriate first and second FIFO write lines 328 and 334, respectively, to write the data from the image memory 306 into the FIFO 308 or 310.

The image controller 304 reads data from the first and second FIFOs 308 and 310 using the signal lines 330 and 336, respectively. When the pixel data is needed for output to the ROS 100, the image controller 304 sends read signals on the appropriate first and second FIFO signal lines 330 and 336, respectively, to read more pixel data from the FIFOs 308 and 310.

The image memory controller 302 controls the transfer of data from the image memory 306 to the first and second FIFOs 308 and 310. After a ROS controller (not shown) starts the image memory controller 302, the image memory controller 302 begins by transferring the pixel data of the first pixel data block $102_1$ from the image memory 306 to the first FIFO 308. Then, the image memory controller 302 transfers the second pixel data block $102_2$ from the image memory 306 to the second FIFO 310. After completing the transfer of the second pixel data block $102_2$ to the second FIFO 310, the image memory controller 302 transfers the third pixel data block $102_3$ to the first FIFO 308, and then the fourth pixel data block $102_4$ to the second FIFO 310 and so on. The image memory controller 302 alternately transfers consecutive pixels data blocks 102 in the image memory 306 to the first and second FIFOs 308 and 310 until all the pixel data blocks 102 are transferred to the first and second FIFOs 308 and 310.

The image memory controller 302 continues to transfer the pixel data of a current pixel data block 102 to the first FIFO 308 until the first FIFO FULL flag is set. Then, the image memory controller 302 waits until the first FIFO 308 clears the first FIFO FULL flag. After the first FIFO FULL flag is cleared, the image memory controller 302 continues to transfer the pixel data of the current pixel data block 102 to the first FIFO 308 until all the pixel data of the current pixel data block 102 is transferred. Then, the image memory controller 302 begins to transfer the next pixel data block 102 as the current pixel data block 102 to the second FIFO 310. If the second FIFO FULL flag is set, then the image memory controller 302 waits until the second FIFO 310 clears the second FIFO FULL flag. After the second FIFO FULL flag is cleared, the image memory controller 302 continues to transfer the pixel data of the current pixel data block 102 to the second FIFO 310 until all the pixel data of the current pixel data block 102 is transferred.

The image memory controller 302 receives the number of pixel data in a pixel data block 102 from the ROS controller through the signal line 344. After the ROS controller starts the image memory controller 302, the image memory controller 302 transfers the first pixel data to the first FIFO 308 assuming that it is the first pixel data of the first pixel data block 1021. The image memory controller 302 keeps the count of the number of pixel data transferred. When the number of pixel data transferred is equal to the number of pixel data in a pixel data block 102, the image memory controller 302 resets the pixel data count and transfers the next pixel data to the second FIFO 310 as the first pixel data of the current pixel data block 102.

Figure 6:
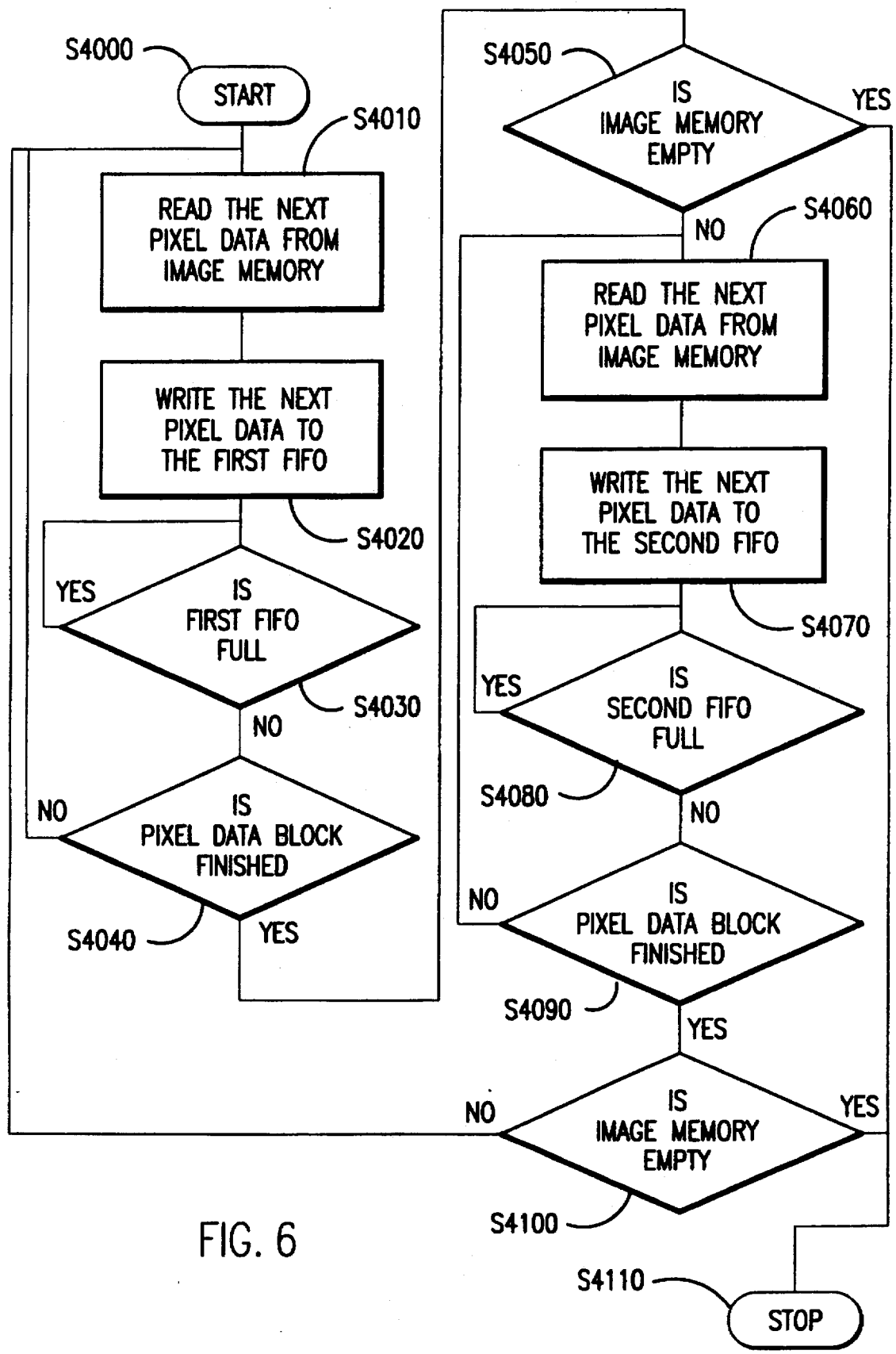
FIG. 6 is a flow chart outlining the first preferred embodiment of the method for transferring data from image memory to the FIFOs.

For the first preferred embodiment, the image memory controller 302 and the image controller 304 operate completely independently and asynchronously relative to each other. Before the ROS 100 begins scanning the beams 12 and 14, the ROS controller sends control signals to the image memory controller 302 to begin loading the first and second FIFOs 308 and 310 with pixel data blocks 102. The image memory controller 302 responds by transferring pixel data from the image memory 306 and to the first and second FIFOs 308 and 310 as shown in FIG. 6.

In step S4000, the ROS controller starts the image memory controller 302. In step S4010, the image memory controller 302 reads the next pixel data from the image memory 306 as the current pixel data of the current pixel data block 102. Then, in step S4020, the image memory controller 302 writes the current pixel data into the first FIFO 308.

The image memory controller 302 continues to step S4030 and checks if the first FIFO FULL flag is set. If the first FIFO FULL flag is set, the image memory controller 302 loops back to step S4030 until the first FIFO FULL flag is cleared.

When the first FIFO FULL flag is cleared, the image memory controller 302 continues to step S4040 and checks if the pixel data block 102 transfer is finished. If the current pixel data block transfer is not finished, then the image memory controller 302 jumps back to step S4010 to continue transferring more pixel data of the current pixel data block 102 to the first FIFO 308. If the current pixel data block transfer is finished, then the image memory controller 302 continues to step S4050.

In step S4050, the image memory controller 302 checks if all the pixel data in the image memory 306 has been transferred to the first and second FIFOs 308 and 310. If all the pixel data have been transferred, then the image memory 306 is empty and the image memory controller 302 jumps to step S4110 and stops. If the image memory 306 is not empty, then the image memory controller 302 continues to step S4060.

In step S4060, the image memory controller 302 reads the next pixel data from the image memory 306 as the current pixel data of the current pixel data block 102. Then, in step S4070, the image memory controller 302 writes the current pixel data into the second FIFO 310.

The image memory controller 302 continues to step S4080 and checks if the second FIFO FULL flag is set. If the second FIFO FULL flag is set, the image memory controller 302 loops back to step S4080 until the second FIFO FULL flag is cleared.

When the second FIFO FULL flag is cleared, the image memory controller 302 continues to step S4090 and checks if the current pixel data block 102 transfer is finished. If the current pixel data block transfer is not finished, then the image memory controller 302 jumps to step S4060 to continue transferring more pixel data of the current pixel data block 102 to the second FIFO 310. If the current pixel data block 102 transfer is finished, then the image memory controller 302 continues to step S4100.

In step S4100 the image memory controller 302 again checks if all the pixel data in the image memory 306 has been transferred to the first and second FIFOs 308 and 310. If all the pixel data have been transferred, then the image memory 306 is empty and the image memory controller 302 jumps to step S4110 and stops. If the image memory 306 is not empty, then the image memory controller 302 jumps back to step S4010 to continue the pixel data transfer process.

The image controller 304 reads the pixel data blocks 102 from the first and second FIFOs 308 and 310. The pixel data read from the first and second FIFOs 308 and 310 are packed such that there are multiple pixel data elements per data byte. The first and second FIFOs 308 and 310 have the same word width as the image memory 306 so that each word read from the image memory 306 is stored unmodified into the appropriate FIFO 308 or 310. Assuming that each pixel data element has 2 bits (i.e., d=2) and the image memory word width is one byte, the image controller 304 converts the bytewise pixel data, packed four pixel data elements per byte, into a serial stream of sequential, 2-bit pixel data elements and outputs the 2-bit pixel data stream to the ROS 100.

The image controller 304 outputs the pixel data blocks 102 read from the first and second FIFOs 308 and 310 in said pixel data stream to the ROS 100. Before the image controller 304 begins, the ROS controller loads control information to the image controller 304 on the signal line 344. After receiving the control information, the image controller 304 reads the pixel data corresponding to a first current pixel data block 102 from the first FIFO 308, converts the first current pixel data block 102 into a first serial pixel data stream, and outputs the first serial pixel data stream to ROS 100 for modulating beam 12. Concurrently, the image controller 304 reads the pixel data corresponding to a second current pixel data block 102 from the second FIFO 310, converts the second current pixel data block 102 into a second serial pixel data stream, and outputs the second serial pixel data stream to ROS 100 for modulating beam 14.

The ROS 100 uses the line sync signal on the signal line 346 to synchronize the first and second serial pixel data streams generated by the image controller 304 with the physical scanning positions of the beams 12 and 14. The image controller 304 waits for a line sync signal from the ROS 100 before outputting the first and second serial pixel data streams to the ROS 100, as shown in FIG. 7.

The ROS controller starts the image controller 304 in step S5000. In step S5010, the image controller 304 waits for a line sync from the ROS 100. If a line sync is not received, then the image controller 304 jumps to step S5040 and checks if the ROS controller has stopped the printer. If the printer is stopped, then the image controller 304 jumps to step S5050 and stops. Otherwise, the image controller 304 jumps back to step S5010 and waits for the line sync again. When the image controller 304 receives a line sync, the control continues to step S5020. While steps S5020 and S5030 are shown as being performed consecutively, it should be appreciated that in the first preferred embodiment of the image controller 304, these steps are performed concurrently. In step S5020, the image controller 304 outputs the first current pixel data block 102 from the first FIFO 308 to the ROS 100. Concurrently, in step S5030, the image controller 304 outputs the second current pixel data block 102 to the ROS 100. Then the image controller 304 jumps back to step S5010.

Figure 7:
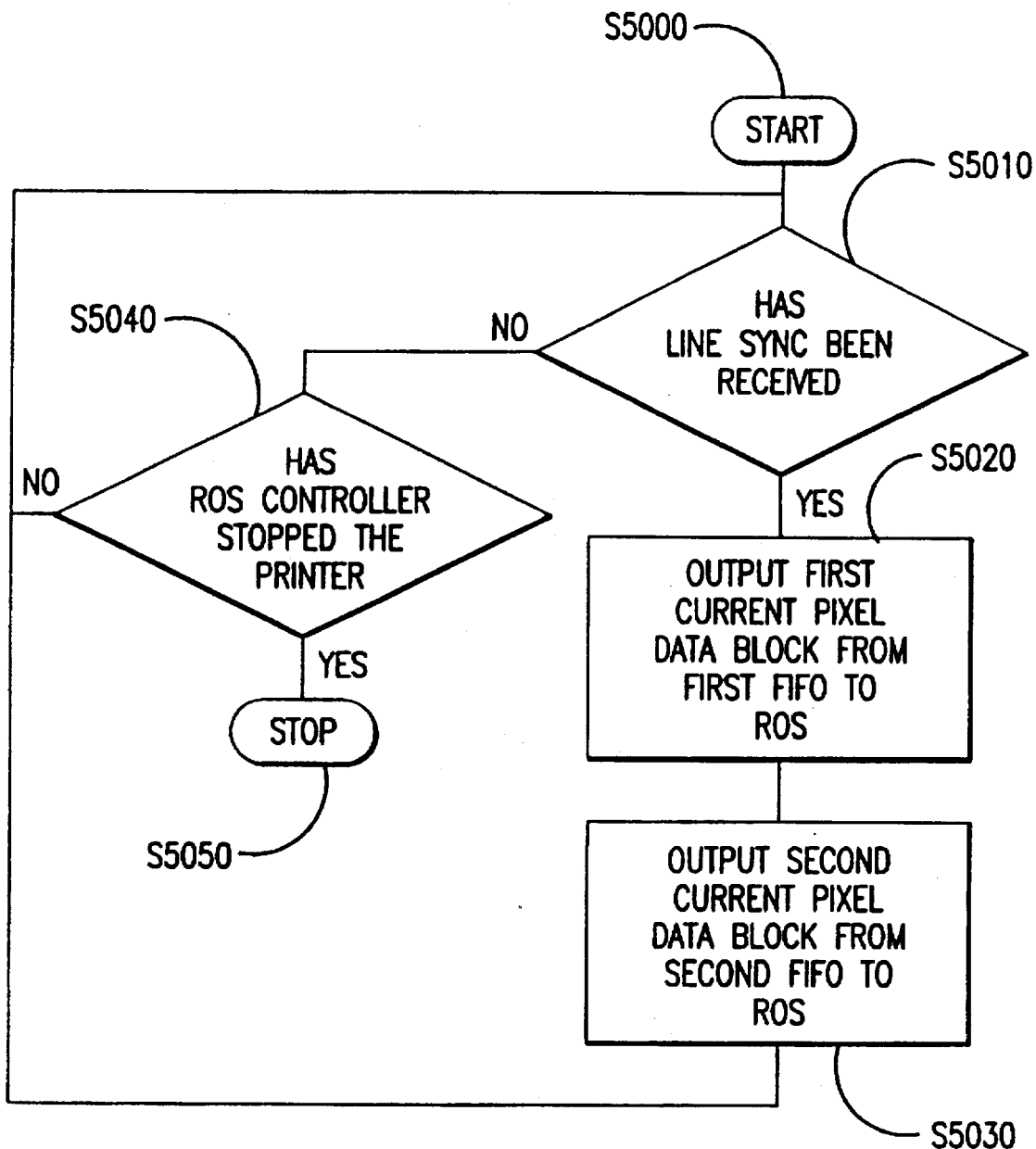
FIG. 7 is a flow chart outlining a preferred embodiment of the method for outputting data from the FIFOs to the ROS.
Figure 8:
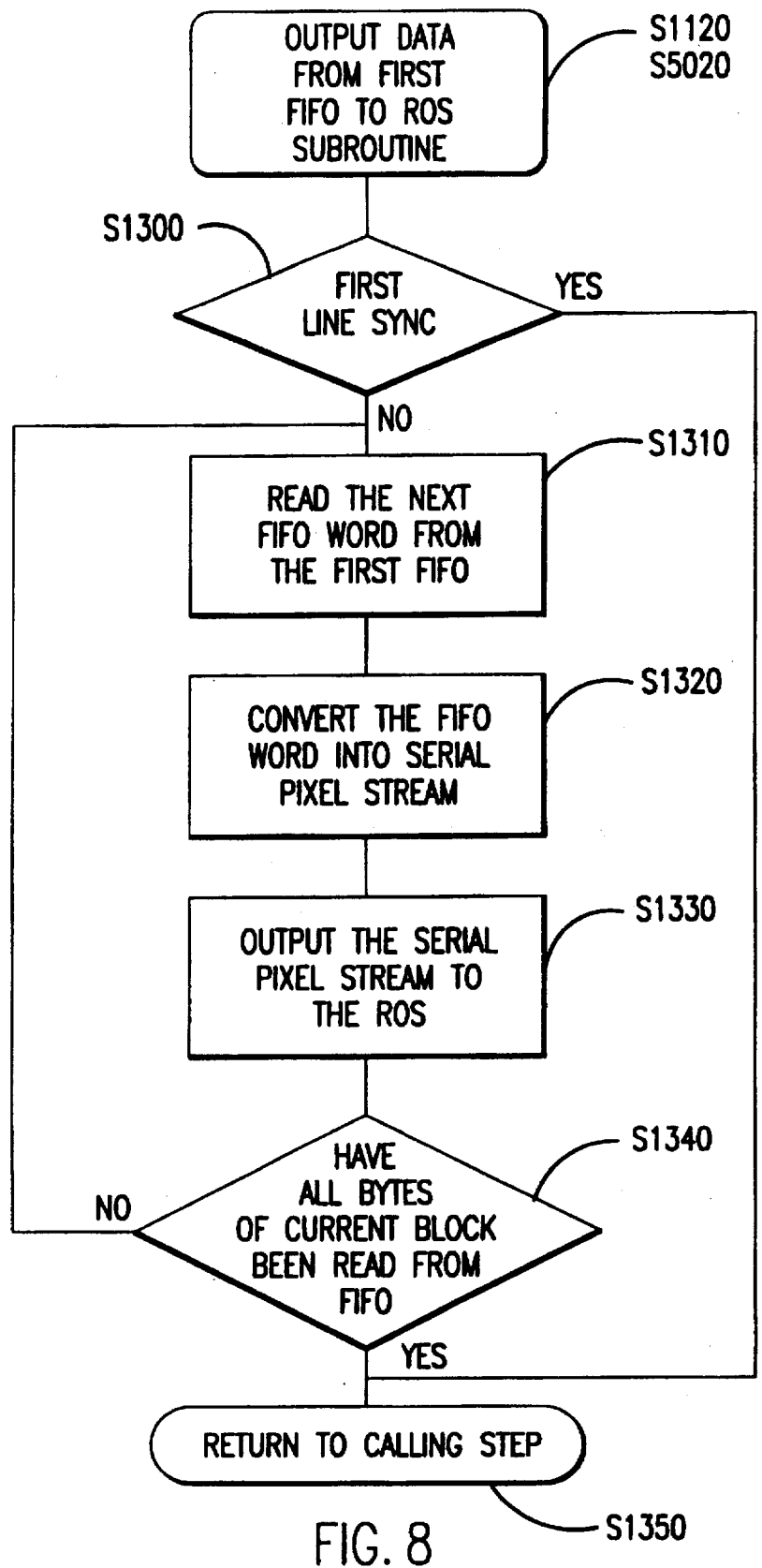
FIG. 8 is a flow chart outlining the first current pixel data block outputting step of FIG. 7.

FIG. 8 shows in greater detail the first FIFO data outputting step (Step S5020) of FIG. 7. In step S1300, the image controller 304 first determines if the line sync signal received is the fiirst line sync signal. If the line sync signal received is the first line sync signal, then the image controller 304 takes no action because beam 12 is turned off for the first scan of every page. The image controller 304 bypasses any processing for beam 12 until receiving the second line sync signal. Thus, the image controller 304 jumps from step S1300 directly to step S1350, which returns control to step S5030.

If, however, the line sync signal received is not the first line sync signal, then the image controller 304 continues to step S1310. In step S1310, the image controller 304 reads a word from the first FIFO 308 as the next word of the first current pixel data block 102 to be output to the ROS 100. Then, in step S1320, the image controller 304 converts the word read from the first FIFO 308 into the serial pixel data stream and in step S1330, outputs this serial pixel data stream to the ROS 100. In step S1340 the image controller determines if all the words of the first current pixel data block 102 have been read, converted and output to the ROS 100. If all the words of the first current pixel data block 102 have not been read, then the image controller 304 returns to step S1310 and proceeds to read the next word from the first FIFO 308. Otherwise, the image controller 304 jumps to step S1350 and returns to the step after the calling step. In this case that would be step S5030.

Figure 9:
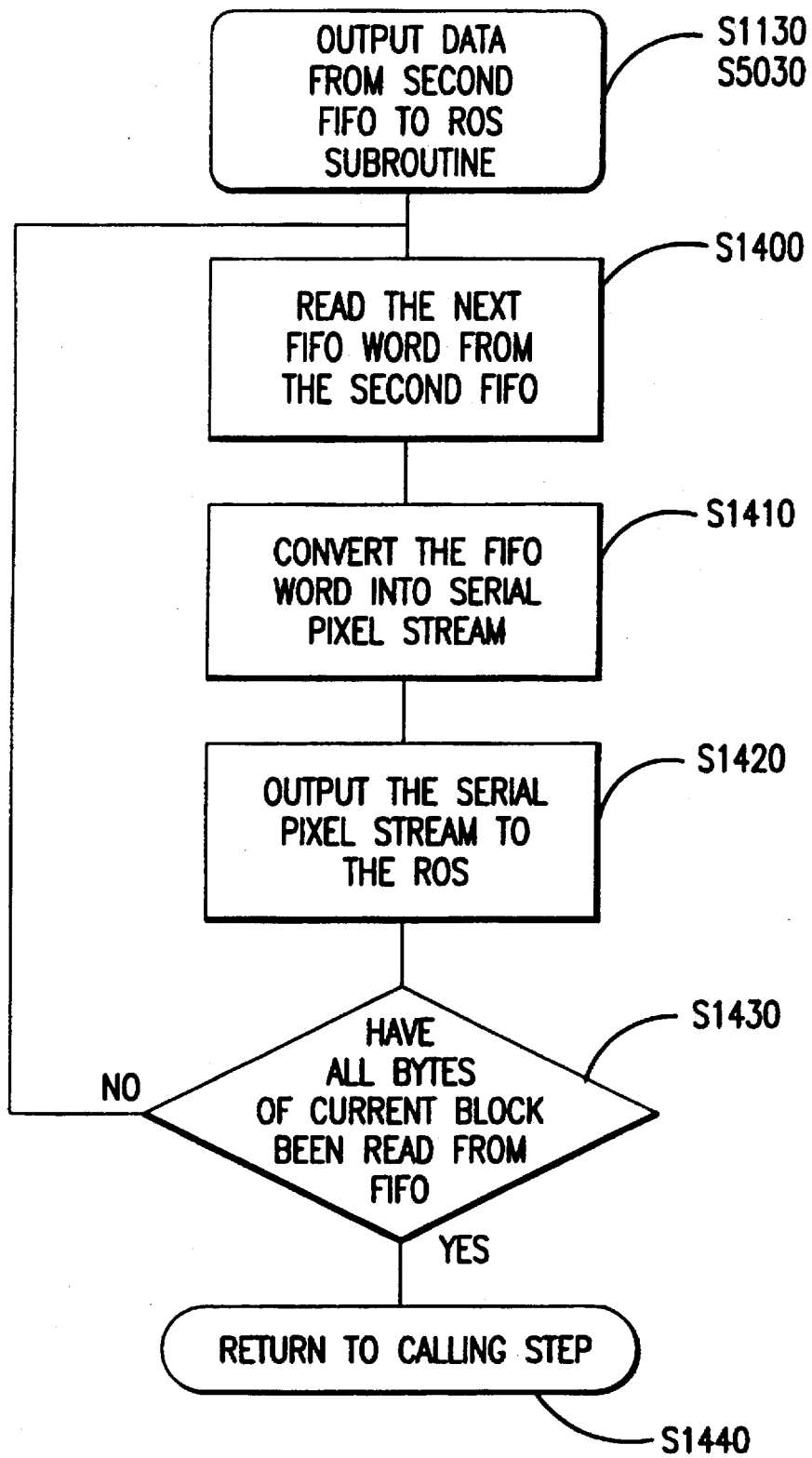
FIG. 9 is a flow chart outlining the second current pixel data block outputting step of FIG. 7.

FIG. 9 shows in greater detail the second FIFO data outputting step (step S5030) of FIG. 7. In step S1400, the image controller 304 reads the next FIFO word of the second current pixel data block 102 to be output to the ROS 100 from the second FIFO 310. In step S1410, the image controller 304 converts the FIFO word into the serial pixel data stream and, in step S1420, outputs the serial pixel data stream to the ROS 100. In step 51430, the image controller 304 determines if all the words of the second current pixel data block 102 are read. If all the words of the current pixel data block 102 have not been read, the image controller 304 returns to step S1400 and read the next FIFO word from the second FIFO 310. Otherwise, the image controller 304 returns to the calling step. In this case, that would be step S5040.

Each of the first and second FIFOs 308 and 310 must store at least two pixel data blocks 102. The number of pixel data blocks 102 that each FIFO must store is dependent on the manner in which pixel data blocks 102 are written into and read from the first and second FIFOs 308 and 310.

The image memory controller 302 continues to write into the first or second FIFOs 308 or 310 until the corresponding first or second FIFO FULL flag is set. Then, the image memory controller 302 stops transferring the pixel data until the FULL flag is cleared. Since the pixel data in the image memory 306 can only be read sequentially, the image memory controller 302 must transfer all the pixel data of the current pixel data block 102 before starting the transfer of the next consecutive pixel data block 102. Accordingly, the image memory controller 302 waits for the first FIFO 308 to clear the first FIFO FULL flag even if the second FIFO FULL flag is already cleared. The image memory controller 302 cannot begin transferring pixel data to the second FIFO 310 until the transfer of the current pixel data block 102 to the first FIFO 308 is completed.

After the ROS controller starts the image memory controller 302 and before the first line sync is generated, the image memory controller 302 can transfer pixel data blocks $102_1$ through $102_4$ into the first and second FIFOs 308 and 310. After transferring these pixel data blocks, both the first and second FIFOs 308 and 310 are full. At this point, the image memory controller 302 cannot transfer the next pixel data block $102_5$ to the first FIFO 308 until the first FIFO 308 clears the first FIFO FULL flag.

Referring to FIG. 4, for the scanning cycle m=1, beam 14 scans scanline 2 and beam 12 does not scan any line. Thus, after the first scanning cycle m=1, the pixel data block $102_2$ is rad from the second FIFO 310 and the second FIFO FULL flag is cleared. However, the first FIFO 308 is still full.

During the second scanning cycle m=2, beam 12 scans scanline 1 while beam 14 scans scanline 4. Thus the pixel data blocks $102_1$ and $102_4$ are read from the first and second FIFOs 308 and 310, respectively. At this point, the image memory controller 302 can start to transfer the pixel data block $102_5$ to the first FIFO 308. Then, only after the transfer of the pixel data block $102_5$ is completed, can the image memory controller 302 transfer the pixel data block 1026 to the second FIFO 310.

During the third scanning cycle m=3, beam 12 scans scanline 3 while beam 14 scans scanline 6. Since scanline 6 require the pixel data block $102_6$ to modulate the beam 14, the image memory controller 302 must complete the transfer of the pixel data block $102_6$ before the beam 14 can complete scanning scanline 6. If the image memory controller 302 completes transferring the pixel data blocks $102_5$ and $102_6$ during the second scanning cycle m=2, then the second FIFO 310 does not need to store a third pixel data block 102. Since the first FIFO 308 is always the first to clear its full flag, neither the first or the second FIFO need to store more than 2 pixel data blocks 102

Figure 10:
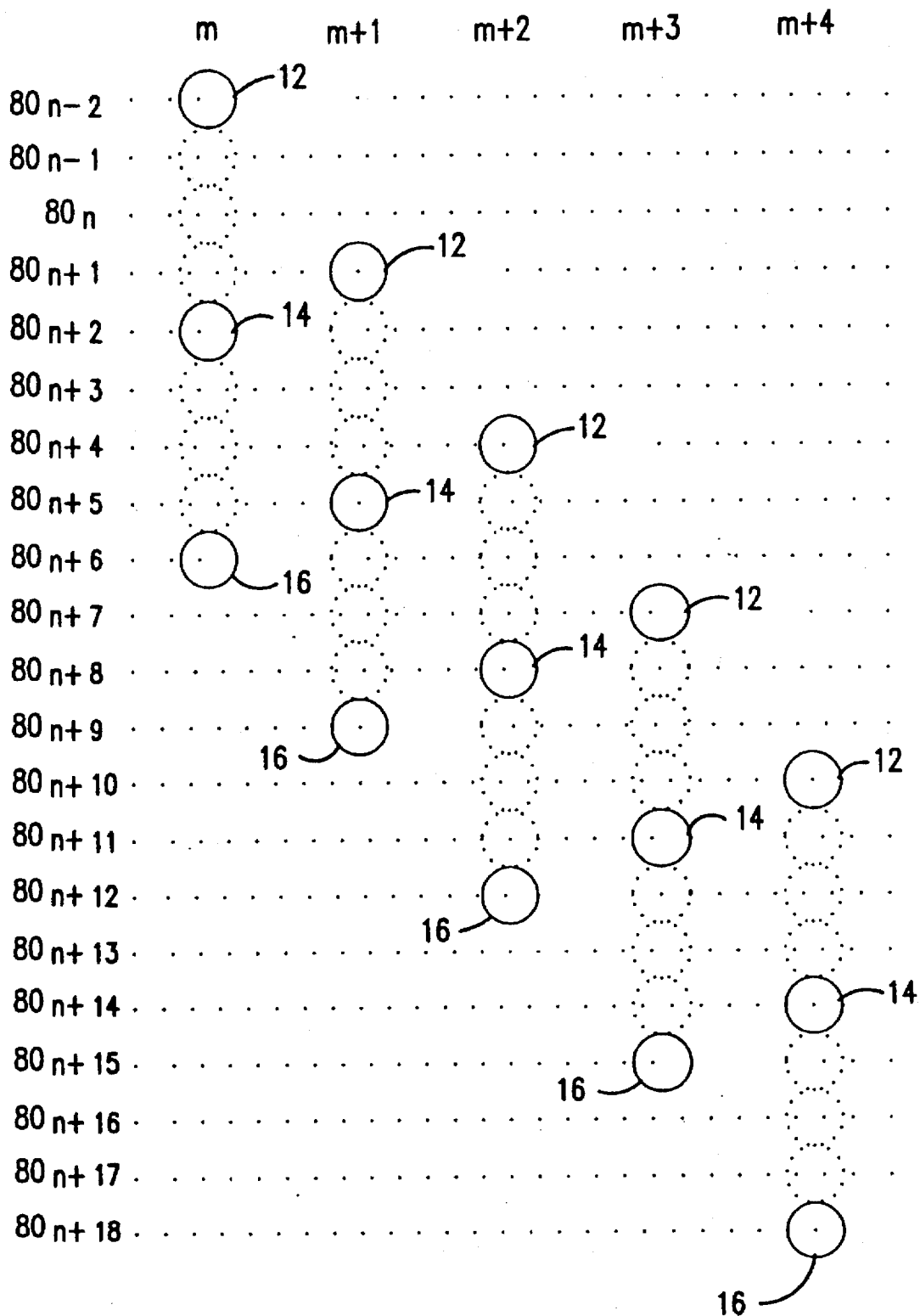
FIG. 10 illustrates the relationship among the scan lines scanned by three beams in response to five consecutive line sync signals.

It should be appreciated that this embodiment can be easily extended to more than two beams. FIG. 10 shows a three beam scanner having an interlace factor of 3. Beams 12, 14 and 16 are separated from each other by three consecutive scanlines 80. Following the similar reasoning set forth above for two beams, a FIFO is dedicated to each beam. Thus, a first FIFO holds the pixel data blocks $102_{3m-2}$ for the beam 12, a second FIFO holds the pixel data blocks $102_{3m-1}$ for the beam 14 and a third FIFO holds the pixel data blocks $102_{3m}$ for the beam 16. In response to the first line sync signal (m=1), the beam 16 scans the scanline $80_3$, while the beams 12 and 14 are turned off. In response to the second line sync signal, the beams 14 and 16 scan scanline $80_2$ and scanline $80_6$, respectively, while the beam 12 remains off. It is not until the third line sync signal (m=3) that the beam 12 scans the scanline $80_1$. For similar reasons as set forth above for the dual beam case, all the FIFOs must hold at least 3 pixel data blocks 102.

The method discussed above can be extended to any number of beams. In addition, although convenient interlace factors were chosen for ease of illustration, any interlace factor can be used. However, imprudent choice of interlace factors can lead to scanning complexities and may require larger FIFO sizes than would otherwise be necessary.

The image controller 304 converts the packed pixel data elements read from the FIFOs 308 and 310 into a serial pixel data stream for output to the ROS 100. For the dual beam embodiment, assuming that the word length for the first and second FIFOs 308 and 310 is one byte and pixel data element is two bits wide, the image controller 304 must convert the pixel data elements packed four per byte into one serial pixel data stream. This conversion must be performed immediately after reading the packed pixel data elements from the first and second FIFOs 308 and 310.

The ROS 100 requires the pixel data to be in a serial stream because the beams 12 and 14 scan the photosensitive recording medium 30 in a serial fashion. Since, for each beam 12 or 14, the corresponding pixel data element is two bits wide, the ROS 100 needs to have the two bits of each pixel data element presented in parallel followed by the two bits of the next pixel data element. Thus, the ROS 100 requires two serial pixel data bit streams for each beam 12 or 14, where the two corresponding bits from each serial pixel data bit stream correspond to one pixel data element.

Figure 11:
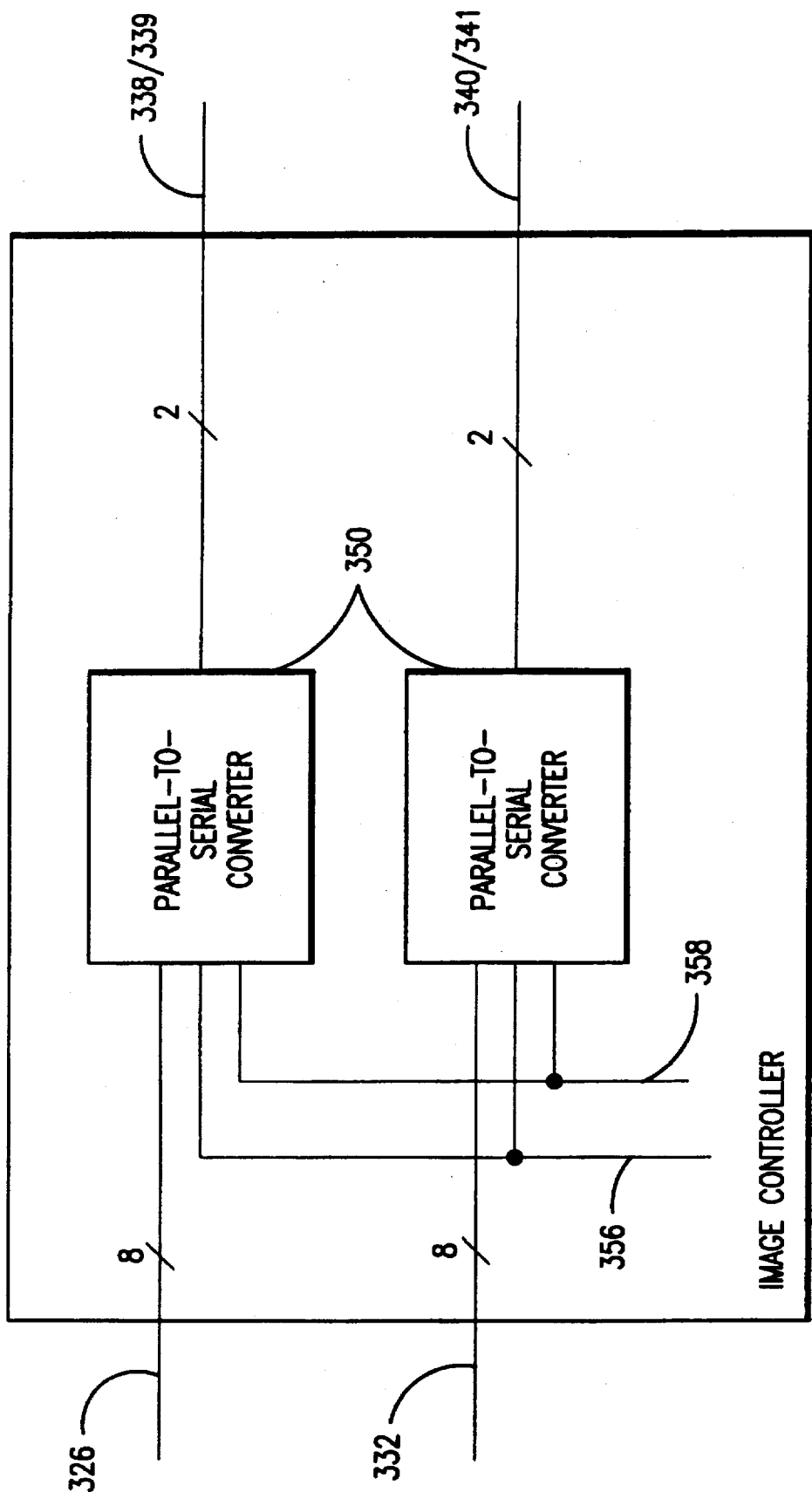
FIG. 11 is a block diagram of the image controller with two parallel-to-serial conversion circuits.

FIG. 11 shows two parallel-to-serial converters 350 of the image controller 304 that convert the image pixel data elements packed four per byte into two serial pixel data bit streams for each of the two beams 12 and 14. The packed pixel data elements are input to the image controller 304 through signal lines 326 and 332 from the first and second FIFOs 308 and 310, respectively. The serial pixel data bit streams are output to the ROS 100 through the signal lines 338 and 339 to beam 12 and through the signal lines 340 and 341 to beam 14.

Figure 12:
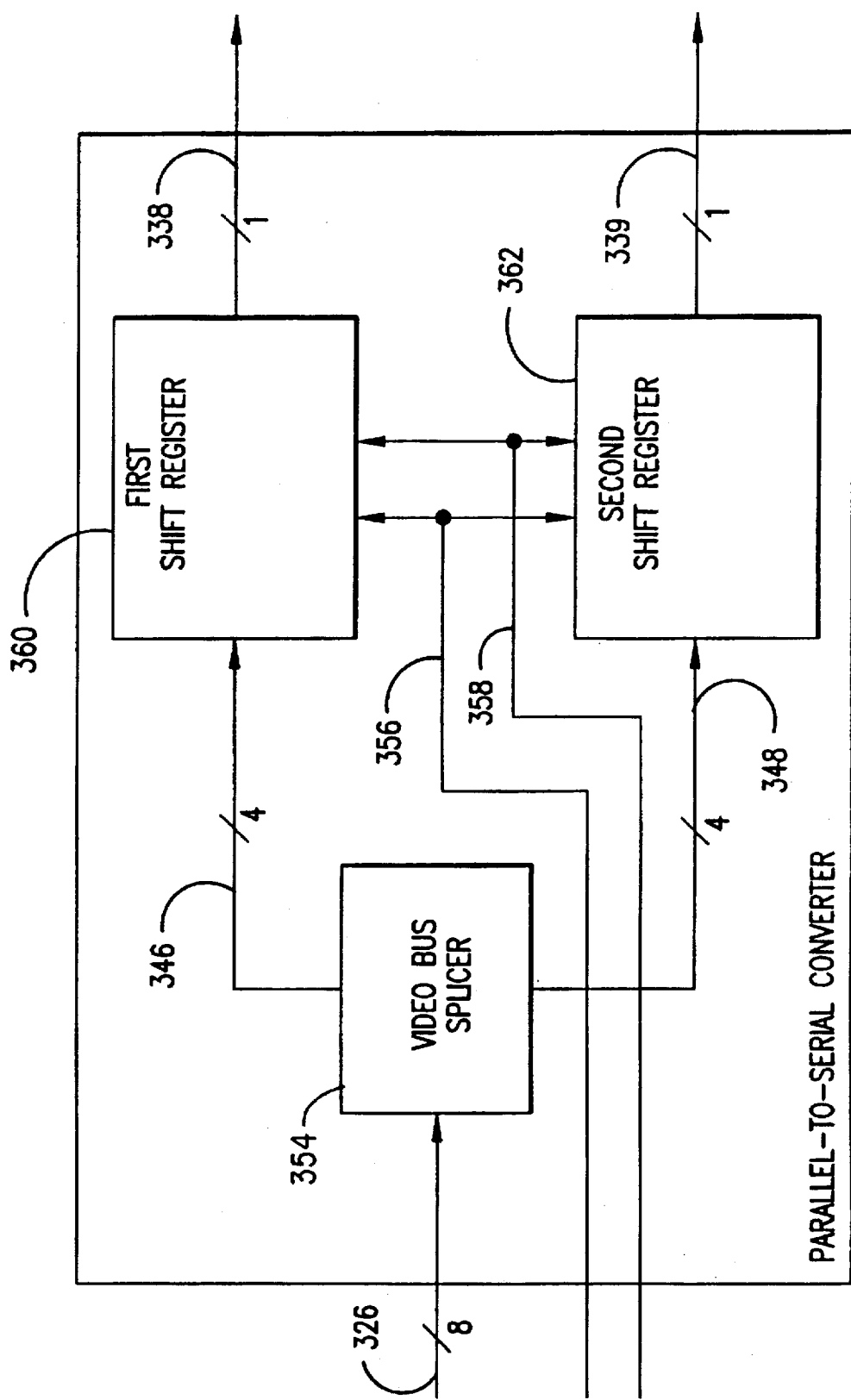
FIG. 12 is a circuit diagram of the parallel-to-serial conversion circuits of FIG. 11.

FIG. 12 shows one of the parallel-to-serial converter 350 connected to signal lines 326, 338 and 339. The pixel data elements packed four per byte from the 8-line-parallel signal line 326 is input to a video bus splicer 354. The output of the video bus splicer 354 is input to a first shift register 360 and a second shift register 362 through the 4-line-parallel signal lines 346 and 348, respectively. The first and second shift registers 360 and 362 load the data from the signal lines 346 and 348 based on a load clock signal on the signal line 356 and output serial bit streams on signal lines 338 and 339 based on a shift clock signal on the signal line 358.

Figure 13:
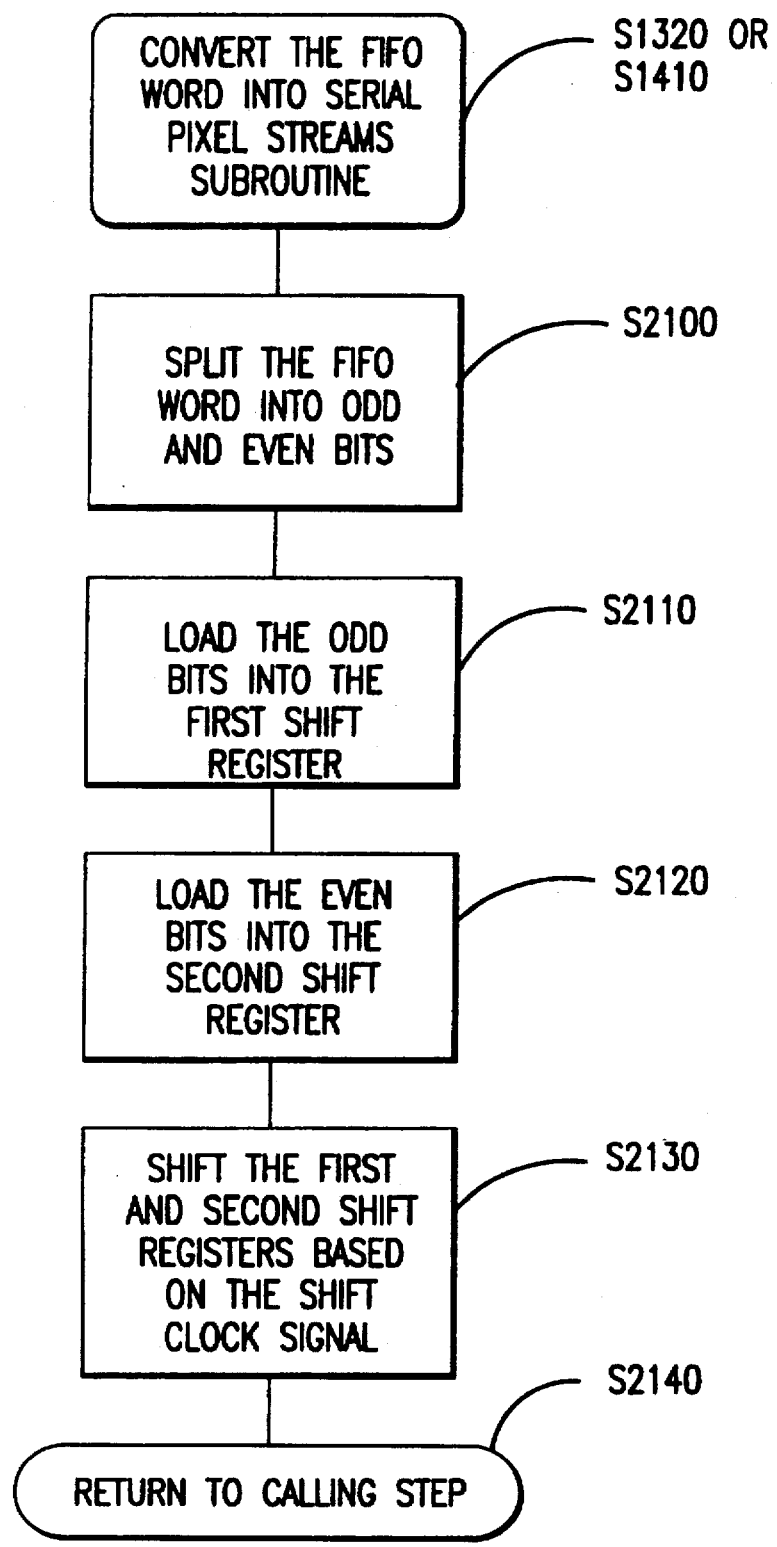
FIG. 13 is a flowchart outlining a preferred embodiment for converting the pixel data block into serial pixel data streams.

The image controller 304 converts the pixel data elements packed four per byte to two serial pixel data bit streams in accordance with the flow chart shown in FIG. 13. In step S2100, the video bus splicer splits the two bits of each pixel data element by separating the odd bits of the byte from the even bits. The odd bits of all four pixel data elements that are packed in the word read from the first FIFO 308 are output to the first shift register 360 over signal line 346. The even bits are output to the second shift register 362 over signal line 348. In steps S2110 and S2120, the first and the second shift registers 360 and 362 simultaneously load, in response to a load clock signal 356, the odd and even bits of the four pixel data elements, respectively.

In step S2130, the shift registers 360 and 362 output the loaded bits serially one bit at a time to signal lines 338 and 339 based on the shift clock from the signal line 358. For each shift clock 358, the odd and even bits coresponding to the same pixel data element are output on signal lines 338 and 339, generating the two serial pixel data bit streams. The shift clock 358 is synchronized with the ROS 100, supplying the pixel data bit values to the ROS 100 in the exact time and order required to modulate the beam 12. The same parallel-to-serial conversion process is performed for input signal on signal line 332 and the serial pixel data bit streams output on signal lines 340 and 341 for the beam 14.

FIG. 14 shows a second preferred embodiment of a ROS data output controller 300 for controlling the multibeam laser 74 of the ROS 100. In this second preferred embodiment, the ROS 100 includes the two beams 12 and 14 and uses an interlace factor of 2. The ROS data output controller 300 comprises the image memory controller 302, the image controller 304, the image memory 306, the first FIFO 308 and the second FIFO 310. The image memory 306 is connected to and controlled by the image memory controller 302 through the control signal line 316. The first FIFO 308 and the second FIFO 310 receive the pixel data from the image memory controller 302 through the data signal line 312. When the write signals to the FIFOs 308 and 310 are received through the write signal lines 328 and 334, the pixel data that is placed on the signal lines 312 by the image memory controller 302 is written into the corresponding one of the first and second FIFOs 308 and 310. In contrast to the first preferred embodiment, in the second preferred embodiment, the image controller 304 coordinates the operation of the image memory controller 302 and the first and second FIFOs 308 and 310 to produce the stream of serial pixel data required to modulate the beams 12 and 14 of the ROS 100.

As shown in FIG. 14, the image memory controller 302 reads the pixel data from the image memory 306 using the signal line 316. The pixel data received from the image memory 306 by the image memory controller 302 is transferred to one of the first or second FIFOs 308 or 310 on the signal lines 312. The image memory controller 302 outputs an image request return clock on signal line 318 to signal to the image controller 304 that the pixel data read from the image memory 306 is ready to be received by the first and second FIFOs 308 and 310.

The image controller 304 controls the first FIFO 308 with the write line 328 and the read line 330 and the second FIFO 310 with the write line 334 and the read line 336. When data from the image memory controller 302 is ready to be received on the signal line 312, the image controller 304 outputs write signals on the appropriate first and second FIFO write lines 328 and 334, respectively, to write the data from the image memory controller 302 into the FIFO 308 or 310. When pixel data is needed for the ROS 100, the image controller 304 outputs read signals on the appropriate first and second FIFO read lines 330 and 336, respectively, to read more pixel data from the FIFOs 308 and 310.

The scanning process is started by the ROS controller by sending control signals on the signal line 344 to the image controller 304. In response to the ROS controller, the image controller 304 transfers the pixel data blocks $102_1$ and $102_2$ from the image memory 306 into the first and second FIFOs 308 and 310, respectively. The pixel data corresponding to the second (but first scanned) scanline $80_2$ is the first pixel data block $102_2$ that is output to the RQS 100. When the beam 14 is ready to scan the second scanline $80_2$, the ROS 100 issues a first line sync signal on the signal line 346. Based on the first line sync signal, the image controller 304 outputs the serial pixel data stream synchronized to the ROS 100 to modulate the beam 14.

Beginning with first line sync signal (m=1), the beam 14 scans the second scanline $80_2$. Thus, the pixel data block $102_2$ corresponding to the second scanline $80_2$ must be ready for scanning before the first line sync signal. Since the image memory 306 stores the pixel data blocks 102 sequentially by scanline number, both the first and second pixel data blocks $102_1$ and $102_2$ corresponding to the first and second scanlines $80_1$ and $80_2$, respectively, must be read from the image memory 306. It is possible to read the pixel data block $102_2$ out of the image memory 306, write the pixel data block $102_2$ into the second FIFO 310, read the pixel data block $102_2$ from the second FIFO 310, convert the pixel data elements into a pixel data stream, and output the pixel data stream to the ROS 100 all during the same line sync signal. However, in the second preferred embodiment, the pixel data blocks $102_1$ and $102_2$ are read before the first line sync to eliminate possible race conditions that may occur. Thus, the pixel data blocks $102_1$ and $102_2$ are transferred before the first line sync signal is issued by the ROS controller.

Figure 15A:
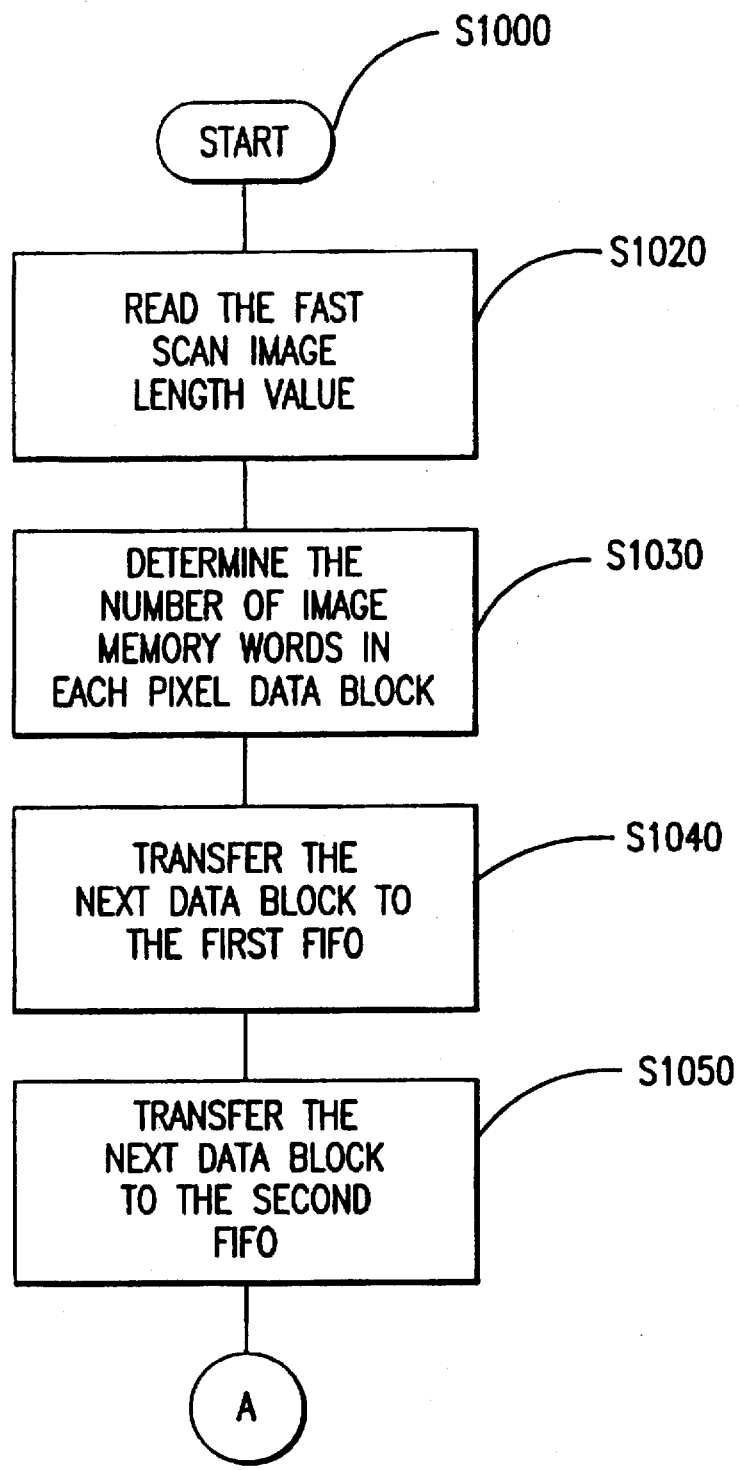
FIGS. 15A and 15B are a flow chart of the second preferred embodiment of a method for operating the FIFOs.
Figure 15B:
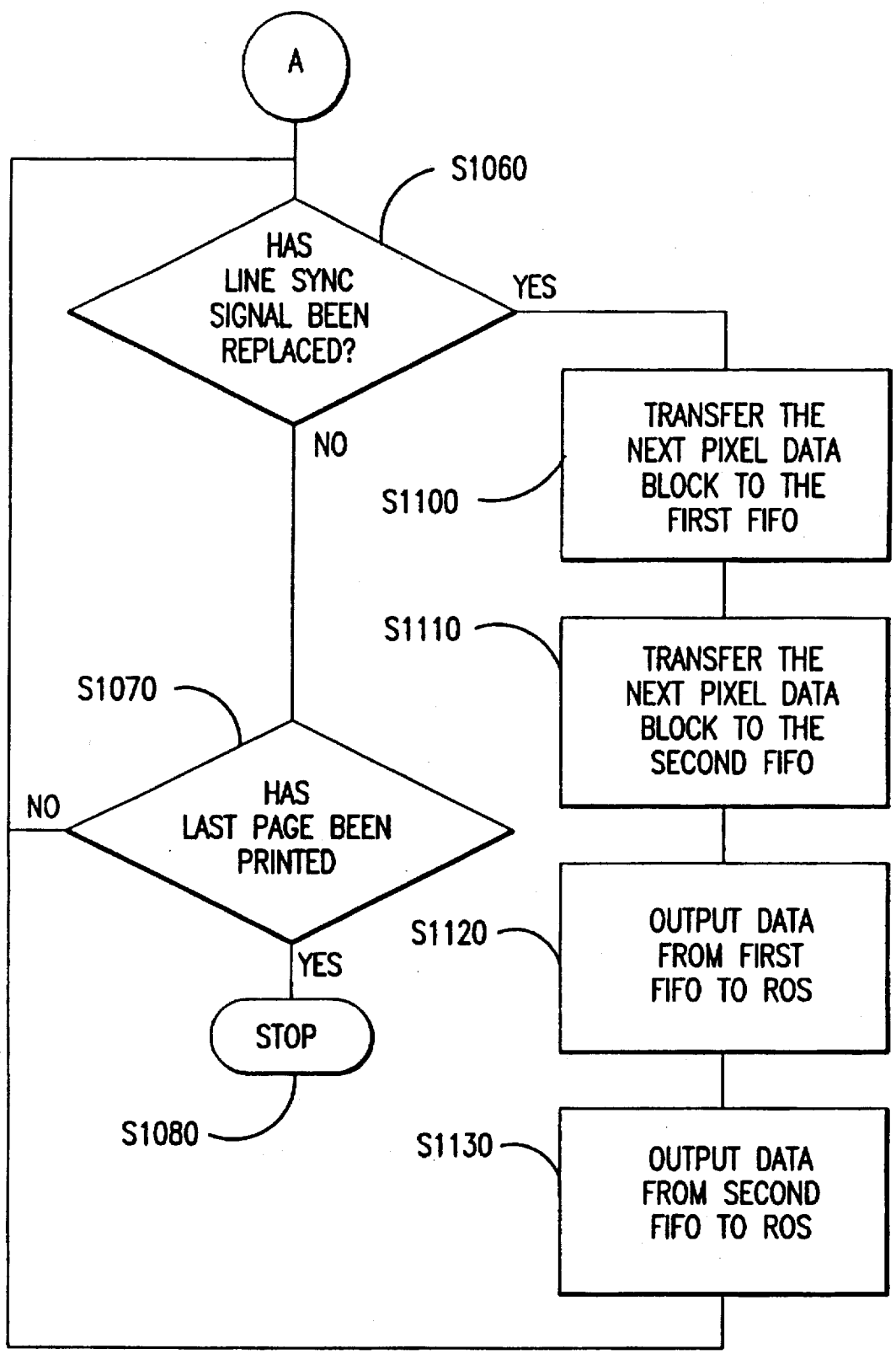

FIGS. 15A and 15B show the process for loading data into and reading data from the first and second FIFOs 308 and 310. In step S1000 of FIG. 15A, the ROS controller starts printing the image by starting the ROS 100 and the image controller 304.

In step S1020, the image controller 304 reads the fast scan image length value from the signal line 324. Then, in step S1030, the image controller 304 determines the number of image memory words in each pixel data block 102 based on the fast scan image length value. The number of words in each pixel data block 102, in turn, determines the number of write and read signals that must be output to the FIFOs 308 and 310 to receive or extract one pixel data block 102.

In step S1040, the first pixel data block $102_1$, corresponding to the first scanline $80_1$ of the image, is transferred from the image memory 306 to the first FIFO 308. Then, in step S1050, the second pixel data block $102_2$, corresponding to the second scanline $80_2$, is transferred from the image memory 306 into the second FIFO 310. All of the above steps occur before the first line sync signal is issued.

Next, in step S1060, the image controller 304 checks for a line sync signal on signal line 346. If a line sync signal has been received, the image controller 304 jumps to step S1100. Otherwise, if the line sync signal has not been received, the image controller 304 continues to step S1070. In step S1070, the image controller 304 determines if the printing process has ended. If the printing process has ended, the image controller 304 continues to step S1080 and stops processing. Otherwise, if the printing process has not ended, the image controller 304 returns to step S1060.

Otherwise, if, in step S1060, a line sync signal is received, the image controller 304 jumps from step S1060 to step S1100. Steps S1100 and S1110 are performed sequentially as shown. However, while steps S1120 and S1130 are shown as being performed consecutively, it should be appreciated that, in the second preferred embodiment of the image controller 304, these steps are performed concurrently with steps S1100 and/or S1110.

First, in step S1100, the image controller 304 transfers the next pixel data block $102_{2n-1}$ from the image memory 306 to the first FIFO 308. Then, in step S1110, the image controller 304 transfers the next pixel data block $102_{2n}$ from the image memory 306 to the second FIFO 310. Second, concurrently with step S1100 and S1110, in step S1120, the image controller 304 outputs data of the pixel data block $102_{2n-5}$ from the first FIFO 308 to the ROS 100. The image controller 304 reads the pixel data block $102_{2n-5}$ from the first FIFO 308, converts the pixel data elements that are packed in each byte (when the FIFO word width is one byte) into a first serial pixel data stream and outputs the first serial pixel data stream to the ROS 100 for modulating beam 12. Concurrently with steps S1100–S1110 and S1120, in step S1130, the image controller 304 outputs data from the second FIFO 310 to the ROS 100. The image controller 304 reads the pixel data block $102_{2n-2}$ from the second FIFO 310, converts the pixel data elements that are packed in each byte into a second serial pixel data stream and outputs the second serial pixel data stream to the ROS 100 for modulating beam 14.

The image controller 304 communicates with the image memory controller 302 to transfer the pixel data blocks $102_{2n-1}$ and $102_{2n}$ from the image memory 306 to the first and second FIFOs 308 and 310. The image memory controller 302 reads the next image memory word from the image memory 306 in response to an image controller request line sync signal by the process shown in FIG. 16.

Figure 16:
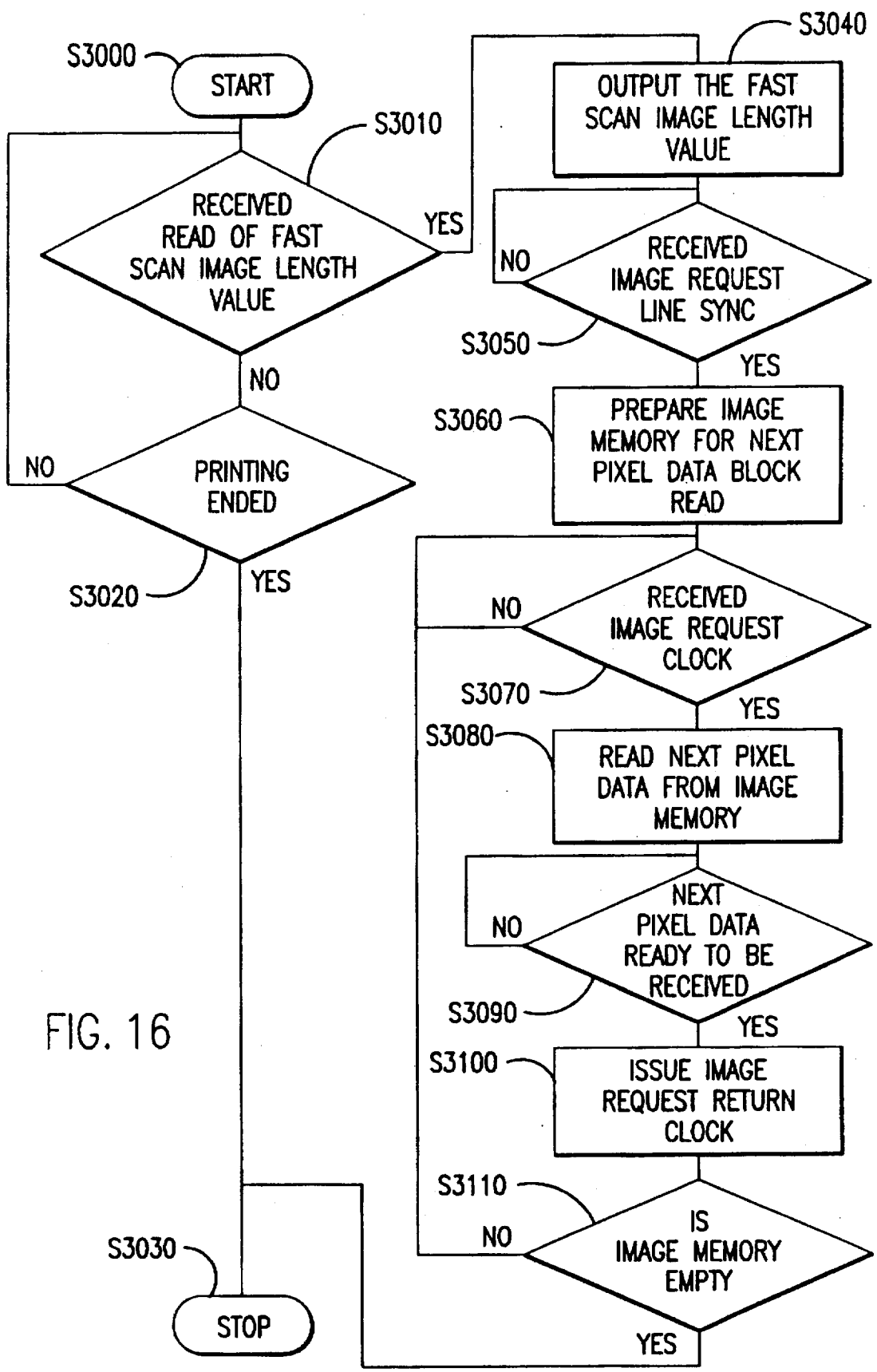
FIG. 16 is a flow chart outlining the second preferred embodiment of the method for reading data from the image memory by the image controller.

In step S3000 of FIG. 16, the ROS controller starts the image memory controller 302 and the image memory controller 302 moves to step S3010. In step S3010, the image memory controller 302 determines if the image controller 304 issued a read request signal for the fast scan image length value on the signal line 324. If the read request signal is received, the image memory controller 302 jumps to step S3040. In step S3040, the image memory controller 302 outputs the fast scan image length value to the image controller 302. Otherwise, the image memory controller 302 continues to step S3020, where it determines if the printing process has ended. If the printing process has ended, the image memory controller 302 continues to step S3030, where it stops. Otherwise, the image memory controller 302 jumps back to step S3010.

After the image memory controller 302 outputs the fast scan image length value in step S3040, the image memory controller 302 continues to step S3050, where it determines if the image controller 304 has issued an image request line sync signal on signal line 322. If an image request line sync signal has not been received, the image memory controller 302 loops back to step S3050 until the image request line sync signal is received. Once the image memory controller 302 receives the image request line sync signal, control continues to step S3060, where the image memory controller 302 prepares the image memory 306 to read the next pixel data block 102.

Next, in step S3070, the image memory controller 302 determines if the image controller 304 has issued the image request clock signal on the signal line 320. If the image request clock signal has not been received, the image memory controller 302 loops back to step S3070 until the image controller 304 issues the image request clock on the signal line 320. When the image memory controller 302 receives the image request clock signal, then the image memory controller 302 continues to step S4080, where it reads the next image memory word from the image memory 306. Then, in step S3090, the image memory controller 302 determines if the image memory word read from the image memory 306 is ready to be received by the corresponding one of the first and second FIFOs 308 or 310. The image memory controller loops back to step S3090 until the next image memory word read from the image memory 306 is ready to be received by the corresponding one of the first and second FIFOs 308 or 310. When the image memory 306 indicates that the next image memory word is ready to be received, the image memory controller 302 moves to step S3100 and issues the image request return clock signal on the signal line 318. Then the image memory controller continues to step S3110 and checks if all the pixel data in the image memory 306 has been read and the image memory 306 is empty. If the image memory 306 is empty then the image memory controller 302 jumps to step S3030 and stops. Otherwise, the image memory controller 302 jumps back to step S3070 to repeat steps S3070–S310.

Figure 17:
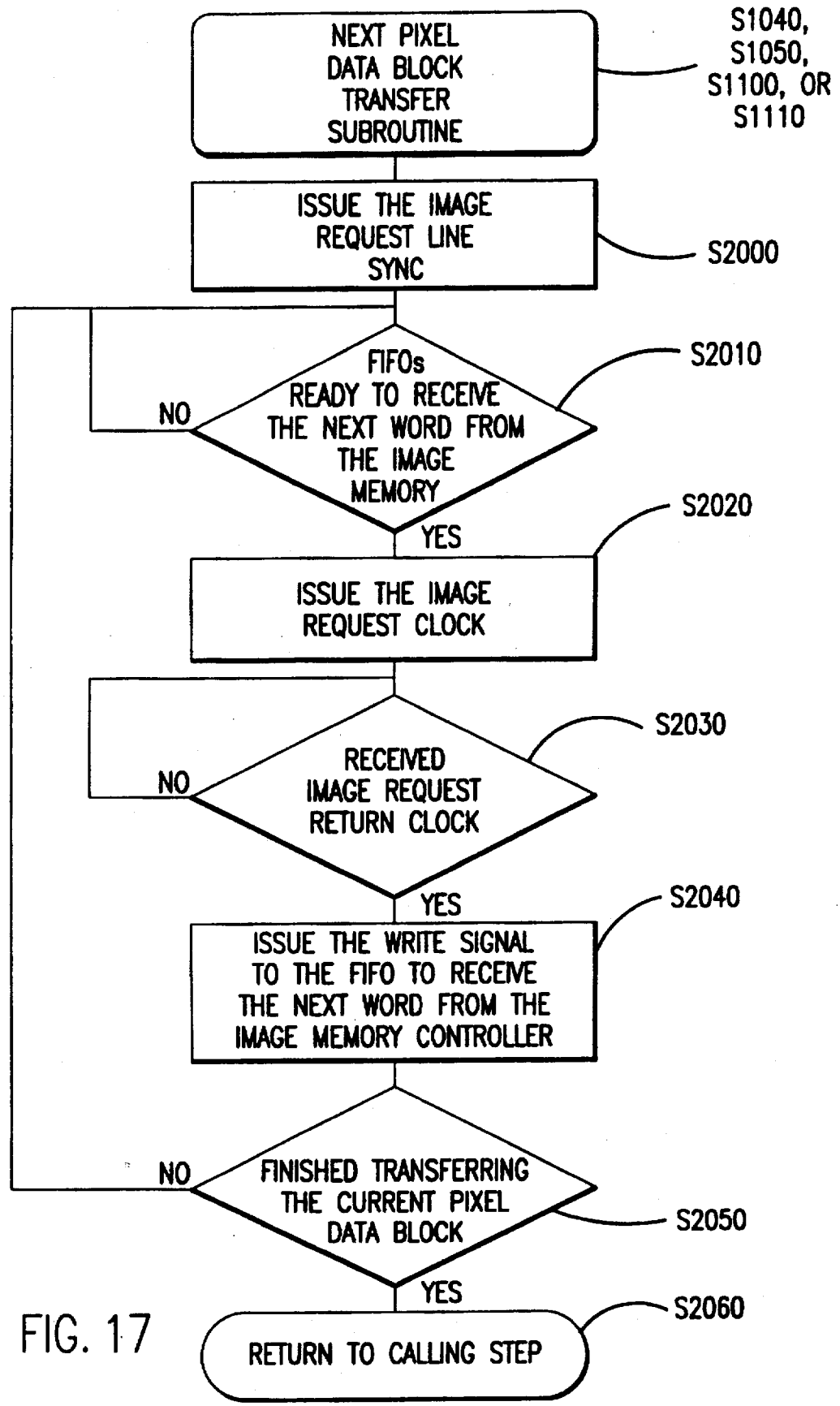
FIG. 17 is a flow chart of the second preferred embodiment of the method for transferring the pixel data blocks to the FIFOs.

FIG. 17 shows the pixel data block 102 transfers of steps S1040, S1050, S1100 and S1110 in greater detail. As shown in FIG. 17, in step S2000, the image controller 304 issues an image request line sync signal on the signal line 322 to inform the image memory controller 302 of the upcoming transfer of the pixel data block 102. The next pixel data block 102 in the image memory 306 now becomes the current pixel data block 102. In step S2010, the image controller 304 determines if the corresponding one of the first and second FIFOs 308 and 310 is ready to receive the next image memory word from signal line 312 or 314. If the corresponding one of the first and second FIFOs 308 or 310 are not ready to receive the next image memory word from the image memory controller 302, the image controller 304 loops back to step S2010 until the FIFOs 308 or 310 are ready. Once the corresponding one of the first and second FIFOs 308 and 310 are ready to receive the next image memory word of the current pixel data block 102, in step S2020, the image controller 304 issues an image request clock signal on the signal line 320 to the image memory controller 302. In step S2030, the image controller 304 waits for the image request return clock signal to be issued by the image memory controller 302. If the image request return clock signal has not been issued by the image memory controller 302, the image controller loops through step S2030. Upon receiving the image request return clock signal, in step S2040, the image controller 304 issues a write signal on one of the signal lines 328 and 334 to the first or second FIFO 308 or 310 to write the word on signal line 312 into the next location in the corresponding one of the first or second FIFO 308 or 310.

After writing the next word of the current pixel data block 102 to the corresponding one of the first or second FIFO 308 or 310 in step S2040, in step S2050, the image controller 304 determines if there are more words to be read for the current pixel data block 102. If, in step S2050, the image controller 304 determines that there are more words to be read, the image controller 304 returns to step S2010. This continues until all the words of the current pixel data block 102 are transferred from the image memory 306 to the corresponding one of the first or second FIFO 308 or 310. Once all the words of the current pixel block 102 are transferred to the corresponding one of the first or second FIFO 308 or 310, the image controller 304 continues from step S2050 to step S2060, and returns the control to the step following the calling step.

FIG. 8 shows the output of pixel data blocks 102 from the first FIFO 308 to the ROS 100 of step S1120 in greater detail. Step S1120 of the second preferred embodiment is identical with step S5020 of the first preferred embodiment. FIG. 9 shows the output of the pixel data blocks 102 from the second FIFO 310 to the ROS 100 of step S1130 in greater detail. Step S1130 of the second preferred embodiment is identical with step S5030 of the first preferred embodiment.

For the second preferred embodiment, the image controller 304 transfers the pixel data blocks 102 into the FIFOs 308 and 310 at the same rate as it reads pixel data blocks 102 out of the FIFOs 308 and 310. Thus, the FIFO 308 and 310 sizes are determined solely by the difference in the order in which the pixel data blocks 102 are written into and read out of the FIFOs 308 and 310. Before the first line sync signal, in steps 1040 and 1050, the image controller 304 transfers the first and second pixel data blocks $102_1$ and $102_2$, corresponding to the first and second scanlines $80_1$ and $80_2$, respectively, into the first and second FIFO 308 and 310. In response to the first line sync signal, in step S1100 and S1110 of the FIG. 15B, the image controller 304 transfers the third and fourth pixel data blocks $102_3$ and $102_4$, corresponding to the third and fourth scanlines $80_3$ and $80_4$, respectively, from the image memory 306 into the first and second FIFO 308 and 310. While transferring the pixel data blocks $102_3$ and $102_4$, the image controller 304 reads the second pixel data block $102_2$ corresponding to the second scanline $80_2$ out of the second FIFO 310. Thus, in response to each line sync signal m, the two pixel data blocks $102_{2m+1}$ and $102_{2m+2}$, currently being transferred, are written into the first and second FIFOs 308 and 310, while the two previously transferred pixel data blocks $102_{2m-3}$ and $102_{2m}$ are read out of the first and second FIFOs 308 and 310, respectively. Once the two pixel data blocks $102_{2m-3}$ and $102_{2m}$ are output to the ROS 100, the spaces in the FIFOs 308 and 310 occupied by these previous pixel data blocks $102_{2m-3}$ and $102_{2m}$ can be overwritten with the next two pixel data blocks $102_{2m+3}$ and $102_{2m+4}$.

Accordingly, the second FIFO 310 must be able to store at least two pixel data blocks 102. Beginning with the second line sync signal, the second FIFO 310 contains the second pixel data block $102_2$ that is being output to the ROS 100, while the fourth pixel data block $102_4$ is being written into the second FIFO 310. At this point $102_2$ and $102_4$ are the only two pixel data blocks residing in the second FIFO 310. Beginning with the third line sync signal, the second pixel data block $102_2$ may be discarded because the information contained in the second pixel data block $102_2$ has been used to modulate the beam 14 and will not be used again. Thus, the sixth pixel data block $102_6$ transferred to the second FIFO 310 beginning with the third line sync signal can overwrite the second pixel data block $102_2$. The eighth pixel data block $102_8$ can similarly overwrite the fourth pixel data block $102_4$ beginning with the fourth line sync signal.

The first FIFO 308 must be able to store at least three pixel data blocks 102. In response to the first line sync signal, while the first pixel data block $102_1$ is not read out, the third pixel data block $102_3$, is written into the first FIFO 308. In response to the second line sync signal, the image controller 304 reads the first pixel data block $102_1$ from the first FIFO 308 to modulate beam 12 while the fifth pixel data block $102_5$ is written in the first FIFO 308. After the third line sync signal, the first pixel data block $102_1$ is no longer needed and may be discarded. In response to the third line sync signal, the image controller 304 writes the seventh pixel data block $102_7$, into the same addresses that the first pixel data block $102_1$ had been stored. While the seventh pixel data block $102_7$ is written into the first FIFO 308, the third pixel data block $102_3$ is read out: to modulate beam 12. The fifth pixel data block $102_5$ simply remains in the first FIFO 308. Therefore, the minimum number of the pixel data blocks 102 that must be able to be stored in the first FIFO 308 is three.

It should be appreciated that, similar to the first preferred embodiment, the second preferred embodiment can also be easily extended to more than two beams as shown in FIG. 10. Following the similar reasoning set forth above for two beams, a FIFO is dedicated to each beam. Thus, a first FIFO holds the pixel data blocks 102 for beam 12, a second FIFO holds the pixel data blocks 102 for beam 14 and a third FIFO holds the pixel data blocks 102 for beam 16. For similar reasons as set forth above for the dual beam case, the first FIFO 308 must hold at least 4 pixel data blocks 102, the second FIFO 310 must hold at least 3 pixel data blocks 102 and the third FIFO (not shown) must hold at least 2 pixel data blocks 102.

The method of the second embodiment can be extended to any number of beams. In addition, although convenient interlace factors were chosen for ease of illustration, any interlace factor can be used. However, imprudent choice of interlace factors can lead to scanning complexities and may require larger FIFO sizes than would otherwise be necessary.

The ROS data output controller 300 of both the first and the second embodiments may be practiced in a variety of ways. For example, the image controller 304, the first and second FIFOs 308 and 310, the image memory 306 and the image memory controller 306 may be implemented using dedicated hardware components. Alternatively, a CPU complex having appropriate software/firmware including peripheral connections compatible with other printer hardware can be used.

As many different embodiments of this invention may be made without departing from the spirit and scope thereof, it is to be understood that the invention is not limited to the specific embodiments thereof except as defined in the appended claims.

What is claimed is:

1. A raster output scanner data controller which supplies pixel data of an image to a multibeam raster output scanner, the data controller comprising:

an image memory for storing a plurality of pixel data blocks, each pixel data block comprising a plurality of image memory words, each image memory word containing at least one pixel data element;

a plurality of first-in, first-out memories, each first-ill, first-out memory storing a plurality of pixel data blocks read from the image memory;

an image data control system which controls the image memory and the plurality of first-in, first-out memories to transfer the plurality of pixel data blocks from the image memory into the plurality of first-in, first-out memories and to convert the memory words read from each first-in, first-out memory into a plurality of serial pixel data bit streams, the image data control system outputting directly to the multibeam raster output scanner, wherein each of the plurality of pixel data blocks that corresponds to non-adjacent scanlines is stored in one of the plurality of first-in, first-out memories, and wherein:

each of the plurality of first-in, first-out memories corresponds to one of a plurality of beams;

each pixel data block is identified with one of the plurality of first-in, first-out memories; and each pixel data block read from the image memory is stored in the identified first-in, first-out memory.

2. The data controller of claim 1, wherein the image memory stores the plurality of pixel data blocks in a scan line order.

3. The data controller of claim 1, wherein the image data control system comprises:

an image memory controller which controls the image memory; and an image controller which controls the image memory controller and the plurality of first-in, first-out memories, wherein the image controller synchronizes the image memory controller and the plurality of first-in, first-out memories to transfer the pixel data from the image memory to the plurality of first-in, first-out memories, the image controller converting the pixel data read from the first-in, first-out memories into the plurality of serial pixel data bit streams, the image controller outputting the plurality of serial pixel data bit streams to the multibeam raster output scanner.

4. The data controller of claim 3, wherein the image controller includes:

write signal generating means for generating a plurality of write signals, the plurality of first-in, first-out memories responding to the plurality of write signals by writing the image memory words read from the image memory into the plurality of first-in, first-out memories; and read signal generating means for generating a plurality of read signals, the plurality of first-in, first-out memories responding to the plurality of read signals by outputting the image memory words from the plurality of first-in, first-out memories.

5. The data controller of claim 4, wherein the image controller further includes a request signal generating means for generating a request signal, the image memory controller responding to the request signal by reading a next image memory word from the image memory and placing the next image memory word onto image memory controller output signal lines; and the image memory controller comprises return signal generating means for outputting a return signal when the next image memory word is ready to be received by one of the plurality of first-in, first-out memories.

6. The data controller of claim 5, wherein the image controller further includes input means for inputting a first external signal and a second external signal, the image controller responding to the first and second external signals by outputting a plurality of request signals to the image memory controller to request the image memory controller to read the image memory, and outputting the plurality of write signals to the plurality of first-in, first-out memories to receive the image memory words output by the image memory controller.

7. The data controller of claim 6, wherein the image controller outputs the plurality of read signals to read the plurality of image memory words from the plurality of first-in, first-out memories in response to the second external signal, the image controller converting the at least one pixel data element packed in each of the plurality of image memory words read from the plurality of first-in, first-out memories into the plurality of serial pixel data streams, the image controller outputting the plurality of pixel data streams to the multibeam raster output scanner.

8. The data controller of claim 1, wherein the image data control system comprises:

an image memory controller which controls the image memory and the plurality of first-in, first-out memories, the image memory controller transferring the pixel data from the image memory to the plurality of first-in, first-out memories; and an image controller which reads the pixel data from the plurality of first-in, first-out memories, the image controller converting the pixel data read from the plurality of first-in, first-out memories into the plurality of serial pixel data bit streams and outputting the plurality of serial pixel data bit streams to the multibeam raster output scanner.

9. The data controller of claim 8, wherein the image controller and the image memory controller operate independently of each other.

10. The data controller of claim 8, wherein:

the image memory controller includes write signal generating means for generating a plurality of write signals, the plurality of first-in, first-out memories writing the image memory words read from the image memory into the plurality of first-in, first-out memories in response to the plurality of write signals; and the image controller includes read signal generating means for generating a plurality of read signals, the plurality of first-in, first-out memories outputting the image memory words from the plurality of first-in, first-out memories in response to the plurality of read signals.

11. The data controller of claim 8, wherein:

the image memory controller includes input means for inputting a first external signal, the image memory controller transferring the pixel data from the image memory to the plurality of first-in, first-out memories in response to the first external signal; and the image controller includes input means for inputting a second external signal, the image controller reading the pixel data from the plurality of first-in, first-out memories, converting the pixel data into the plurality of serial pixel data bit streams, and outputting the plurality of serial pixel data bit streams to the multibeam raster output scanner in response to the second external signal.

12. The data controller of claim 8, wherein each pixel data block comprises a plurality of pixel data elements stored in the image memory in a fast scan order.

13. The data controller of claim 8, wherein the image memory is addressed by words, each word has a word bit width, and each pixel data element stored in the image memory has a pixel data element bit width, the word bit width being an integer multiple of the pixel data element bit width.

14. The data controller of claim 13, wherein each of the plurality of first-in, first-out memories has a same word bit width as the image memory, the words read from the image memory being written into one of the plurality of first-in, first-out memories without a change in format.

15. The data controller of claim 13, wherein the image controller comprises:

a splicer for generating a first number of shift words equal to a pixel data element bit width by separating corresponding bits of the integer of pixel data elements packed into each first-in, first-out memory word read from the plurality of first-in, first-out memories;

a plurality of shift registers, each shift register loaded with one of the first number of shift words; and a shift clock for shifting the plurality of shift registers to generate the plurality of pixel data bit streams output to the raster output scanner.

16. A method for converting pixel data of an image from an image memory and outputting a plurality of pixel data bit streams to a multibeam raster output scanner, comprising:

storing a plurality of pixel data blocks in the image memory in a scanline order;

sequentially reading a subplurality of the pixel data blocks from the image memory;

writing the subplurality of pixel data blocks read from the image memory to a plurality of first-in, first-out memories, wherein each of the plurality of first-in, first-out memories corresponds to one of a plurality of beams, and each of the subplurality of pixel data blocks that corresponds to non-adjacent scanlines is stored in one of the plurality of first-in, first-out memories;

reading the subplurality of pixel data blocks from the plurality of first-in, first-out memories;

converting the subplurality of pixel data blocks read from the plurality of first-in, first-out memories into the plurality of pixel data bit streams;

outputting the plurality of pixel data bit streams to the multibeam raster output scanner.

17. The method of claim 16, wherein the writing step comprises:

writing a portion of the plurality of pixel data blocks stored in the image memory into one of the plurality of first-in, first-out memories.

18. The method of claim 16, wherein each pixel data block comprises a plurality of image memory words, each image memory word comprising at least one pixel data element, and the converting step comprises:

splitting each image memory word read from the plurality of first-in, first-out memories into a first number of shift words based on a second number of bits in the at least one pixel data element;

loading the first number of shift words into a corresponding number of shift registers, one shift word loaded into each shift register;

shifting the shift registers by a shift clock to generate the plurality of pixel data bit streams synchronized with miltibeam the raster output scanner.

19. A data controller for supplying pixel data of an image to a multibeam raster output scanner, the data controller comprising:

storing means for storing a plurality of pixel data blocks in an image memory in a scanline order;

memory reading means for sequentially reading the plurality of pixel data blocks from the image memory;

writing means for writing the plurality of pixel data blocks read from the image memory to a plurality of first-in, first-out memories, wherein each of the plurality of first-in, first-out memories corresponds to one of a plurality of beams, and each of the plurality of pixel data blocks that corresponds to non-adjacent scanlines is stored in one of the plurality of first-in, first-out memories;

reading means for reading the plurality of pixel data blocks from the plurality of first-in, first-out memories;

converting means for converting the plurality of pixel data blocks read from the plurality of first-in, first-out memories into a plurality of pixel data bit streams; and output means for directly outputting the plurality of pixel data bit streams to the multibeam raster output scanner.

* * * * *